(12) United States Patent
Li et al.

(10) Patent No.: US 8,451,914 B2
(45) Date of Patent: May 28, 2013

(54) METHODS AND APPARATUS FOR USING TONES IN A WIRELESS COMMUNICATION SYSTEM

(75) Inventors: Junyi Li, Bedminster, NJ (US); Pablo Anigstein, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1482 days.

(21) Appl. No.: 11/611,831

(22) Filed: Dec. 15, 2006

(65) Prior Publication Data

US 2010/0329365 A1    Dec. 30, 2010

Related U.S. Application Data

(60) Provisional application No. 60/792,291, filed on Apr. 14, 2006, provisional application No. 60/792,366, filed on Apr. 14, 2006.

(51) Int. Cl.
*H04L 27/00* (2006.01)

(52) U.S. Cl.
USPC .......................................... 375/259; 375/295

(58) Field of Classification Search
USPC ................................................. 375/259, 295
See application file for complete search history.

(56) References Cited

U.S. PATENT DOCUMENTS

| | | | |
|---|---|---|---|
| 5,361,258 A * | 11/1994 | Arnold et al. | 370/330 |
| 6,512,779 B1 | 1/2003 | Vollmer et al. | |
| 7,826,807 B2 * | 11/2010 | Laroia et al. | 455/102 |
| 7,929,619 B2 | 4/2011 | Li et al. | |
| 2004/0213326 A1 * | 10/2004 | Parizhsky et al. | 375/133 |
| 2005/0085214 A1 * | 4/2005 | Laroia et al. | 455/403 |
| 2005/0201331 A1 * | 9/2005 | Gaal et al. | 370/332 |
| 2005/0238016 A1 * | 10/2005 | Nishibayashi et al. | 370/389 |
| 2006/0050742 A1 * | 3/2006 | Grandhi et al. | 370/506 |
| 2006/0203709 A1 | 9/2006 | Laroia | |
| 2006/0205355 A1 | 9/2006 | Laroia | |
| 2006/0205356 A1 | 9/2006 | Laroia | |
| 2007/0083669 A1 * | 4/2007 | Tsirtsis et al. | 709/238 |

(Continued)

FOREIGN PATENT DOCUMENTS

| | | |
|---|---|---|
| EP | 589704 | 10/2005 |
| EP | 1791282 A1 | 5/2007 |

(Continued)

OTHER PUBLICATIONS

International Search Report—PCT/US07/066675. International Search Authority—European Patent Office—Nov. 6, 2007.

(Continued)

*Primary Examiner* — Shuwang Liu
*Assistant Examiner* — Nader Bolourchi
(74) *Attorney, Agent, or Firm* — Sam Talpalatsky; Nicholas J. Pauley; Joseph Agusta

(57) ABSTRACT

Methods and apparatus for allocating repeating time periods in a wireless, communication system. A timing reference, such as a beacon is identified. An overhead set of repeating time periods is identified, the overhead set of repeating time periods having an overhead signal periodicity related to the beacon. A data payload set of repeating time periods having a data payload periodicity related to the beacon time period is identified. The overhead set of repeating time periods is divided into a fixed bit-use subset of repeating time periods and a flexible bit use subset of repeating time periods.

26 Claims, 27 Drawing Sheets

U.S. PATENT DOCUMENTS

| | | | |
|---|---|---|---|
| 2007/0153834 A1* | 7/2007 | Qu et al. | 370/478 |
| 2007/0165728 A1 | 7/2007 | Parizhsky | |
| 2007/0177631 A1* | 8/2007 | Popovic et al. | 370/478 |

FOREIGN PATENT DOCUMENTS

| | | | |
|---|---|---|---|
| JP | 2000252940 A | | 9/2000 |
| JP | 2005311920 A | | 11/2005 |
| WO | 03001696 | | 1/2003 |
| WO | WO2005039233 | | 4/2005 |
| WO | WO2005043780 | | 5/2005 |
| WO | WO2005060277 | | 6/2005 |
| WO | WO2005062633 | | 7/2005 |
| WO | 2005081437 | | 9/2005 |
| WO | WO2005109916 | | 11/2005 |
| WO | 2006010327 | | 2/2006 |
| WO | WO2006020520 A2 | | 2/2006 |
| WO | WO2006098992 | | 9/2006 |
| WO | 2007035795 | | 3/2007 |

OTHER PUBLICATIONS

International Search Report—PCT/US07/066676, International Search Authority—European Patent Office—Nov. 6, 2007.

Freeman, "Fundamentals of Telecommunications", 1999, Wiley & Sons, New York, US, XP002454786, ISBN:0-471-29699-6, section 13.6, "Signalling Link Layer".

Fodor, "Performance analysis of a reuse partitioning technique for OFDM based evolved UTRA", International Workshop on Quality of Service, Jun. 19, 2006, pp. 112-120, XP002454120.

Written Opinion—PCT/US2007/066676, International Search Authority, European Patent Office, Oct. 25, 2007.

* cited by examiner

| TONE SUBSET INDEX | TONE MASK |
|---|---|
| 24 | 000110010001011011110000100010110101110<br>011111010001110100001101101100010011101<br>10101011011001010001110110110000011 |
| 25 | 001111001010010011001101100101111100011<br>001111010100011110111010010000110110000<br>011000100010100011110101100001011110 |
| 26 | 101110001011101000011100010011010101110<br>011111000001011110111011111000110100101<br>011110000010011011000100000100100 |
| 27 | 000101010001011011001111000101010010111<br>000010100010011001100010010100101000001<br>011101101011011111010011011011011011 |
| 28 | 001000101110110110000100010111110010001<br>011010101010001110100110001101001001100<br>100011110000101110001110101100101101 |
| 29 | 010001100110100110010000111001010010110<br>010100111100000100001110001100111101111<br>10101100101000100111011110110001001 |
| 30 | 010100001100101001111100001011011011111<br>100010111001110000010100101011110011001<br>11101001000001101100110010000011101 |
| 31 | 111100110001010100001111101111010110011 0<br>000101101000111110110100001011000100001<br>110100011001011101000101100000010011 |
| 32 | 100011100100101101111011010101100011011<br>001010100011111010000110110000010110 1011<br>010001000111000101111000110100100001 |
| 33 | 110000100110011110101100010111110100001<br>110100011010101100001011111100001000101<br>001001011101111010011010100011010000 |
| 34 | 110001011010100110101000100111101010110<br>011110110000011000101011000100010110111<br>001011110011101001001011011000010 |
| 35 | 101111000100101111010011000010011111000<br>101011011000110010001001001000001110110<br>011111010011101111011001010000100 |
| 36 | 010110100001001010011011001010010011001<br>010110100001011001111101001011011001010<br>1011011101100100101110110010100100 |
| 37 | 110111000011010010000010110110101101001<br>111110010010110001000101011011110111 01<br>000011010100101011100001101101101 |
| 38 | 001011010000100110001110000111110000110<br>100001101001110100001111001101010011 00<br>011110101011000111110111100111100001 |
| 39 | 000110111000000111110111110000110110010<br>1000010000011000100011000101111100110<br>111001100011110010010011110010001 |
| 40 | 101110110001101110100001001000100111110<br>110110111101001000110001001010101100110<br>00001111001000111011001100000101101 |
| 41 | 101010011010101011011001000100000110000<br>011001111101001110111000111000101011010<br>1111100001110011000110011010101011000 |

FIGURE 10C

| TONE SUBSET INDEX | TONE MASK |
|---|---|
| 42 | 000001001001111100111001101000001110111 1101011000110101101110001000110101011 110010001110000111100011000010111000 |
| 43 | 110101010100011111001000101000111011010 110110100100110110011101011011011100001 001010100111001100101010000011000010 |
| 44 | 000111001100100001010100101000101001110 101100001101111100010101011010110001011 111011101001010100111010101000010110 |
| 45 | 101111011011111010100000111010000111001 011100011001110110100000110111011101001 100010010000111010010001001110000000 |
| 46 | 011011000101110100001000101110000110010 010110110100111100011010000111110100001 100101001011100111011001110000110001 |
| 47 | 011000011001110001010010100100110000101 110101010111101101010110110010001010101 000110110101110100001010110011011011 |
| 48 | 001011110011000100011001010110100010001 100111000100010010101101010001000100011001 011011011011011111101010000110111010 |
| 49 | 111110000110011101101100011000100011100 110011011001100101010101011101001001 010011100010111011010000010000011100 |
| 50 | 011110100011110111010001011010010101010 110011010010101100011101010010101011001111 1000100100000101100101110001100110 |
| 51 | 101011010111100111101110011011010101111 001111100010110000110000100101100100001 110001100010100100010011010010100100010 |
| 52 | 101100011010001111000110011000001010001 100100111101101100100011010110110111 1100110010111000110000100011001110 |
| 53 | 001001001001101011101000100010110011001 000010001101000110111101001001100101101 1100110000010101010111011101101111 |
| 54 | 001101010010110101111011101010010010111 000110100100001100100110100010101101010 101010111100101000110101001001100011 |
| 55 | 000001000101011100100010000101010011 0010101001011001101010111000011001000011 001110111011101011010111010101110111 |
| 56 | 001110010110110011101010000100111010011100 110111011001101010110100011000100001010 010001100010101101111011101000101010 |
| 57 | 010000110101100011101010011010101001111 010000011010110010100110110111010011110000 1000110010110101001000101100110011 |
| 58 | 011101110110100011110101001010000110 1000111001000001001100010101000111101010 011001110100001000111101000010011111 |
| 59 | 010001001100101001101101011101001110011 111000011011000100010011111010001011010 00101001111010100111101111000101 |

FIGURE 10D

| TONE SUBSET INDEX | TONE MASK |
|---|---|
| 60 | 0011001011100000100001111011000010011100 1111100010111100001010001100000110001100010111011011111011001101111000011 |
| 61 | 1101010001101000101101101000100110001101111000110111100011110110110001101011001001110101101101000010001000100010 |
| 62 | 1011000111100000110010010111110010001100110110111001001000001010000010110110110011010010001110001101010111101111 |
| 63 | 1100011011101000011010010010111100100100000110110111001011001000111001000111001011011011110101000100001101000110 |
| 64 | 101011010111011001101011110110100100110011011000010111000010001001010100110111000001100010110110010001011100101101 |
| 65 | 100111011000111110001101000011101100101010010001010010110010010110100110001101001110110000110010110001101110100101 |
| 66 | 0111100011011100100000010110001100001101010010010100100001100011000111110000010101001000011011010101110011101110111 |
| 67 | 0110010110111000011010100110011101000110110011000100001100100111001001100010010000101100010110110101100110110100011010 |
| 68 | 110001001010000110001011101100001011010011011010100010001100111001001110011101011011110010001001001111001001100011 |
| 69 | 1100110110101010001010010001001110100011010101011100011000010010100001101001011010100010111011001100010110010011111 |
| 70 | 0010010100100100001011011011110110100000101001010011011111010110111100000111010011101011010100010111100111011101000000100 |
| 71 | 0100111010111100100111011100001101000100101110110011101000111101101101010110001011010000001010101110000101011011000 |
| 72 | 10000111001100011000011111011100101001010000101101010000101011110011111011101111000110100001001000101011101001000 |
| 73 | 0110001000010101101001000110110110100111100100101111101001111000100011111000001110100110110001001011101011100100 |
| 74 | 1111100001001101111100111100100100010011010111000100111000001010110011011000111010111010110100111100010000011101101000001 |
| 75 | 11110100111011110001110111100110010100011000010101110010000100000101000110011011000111001000100100110011101011111 |
| 76 | 0011110011010000101011010000100000010000110111101011101101001100111011010010110110100001111100110000010010101 |
| 77 | 011001100111101110010000110001010000100111100111110101100100000100000111010010111011100110001010111101000001110011 |

FIGURE 10E

METHODS AND APPARATUS FOR USING TONES IN A WIRELESS COMMUNICATION SYSTEM

RELATED APPLICATIONS

The present application is a Continuation-In-Part application which claims the benefit of U.S. Provisional Patent Application Ser. No. 60/792,291, filed Apr. 14, 2006, Utility application Ser. No. 11/486,602, filed Jul. 14, 2006; Provisional patent application Ser. No. 60/792,366, filed Apr. 14, 2006; and Utility application Ser. No. 11/486,653 filed Jul. 14, 2006, which are hereby expressly incorporated by reference.

FIELD

This invention relates to communications systems and, more particularly, to methods and apparatus for allocating tones to be used in a wireless communication system.

BACKGROUND

In a cellular wireless system, a service area is divided into a number of coverage zones generally referred to as cells. Each cell may be further subdivided into a number of sectors. Wireless terminals in a cell communicate with the base station that serves the cell. Wireless terminals may include a wide range of mobile devices including, e.g., cell phones and other mobile transmitters such as personal data assistants with wireless modems.

A problem with known cellular communications systems is that transmission by the base station in one sector of a cell may collide with transmissions by the base station in an adjacent sector of the same cell or in a neighboring cell. For example, orthogonal frequency division multiplexed (OFDM) systems take a given bandwidth and splits it into a number of evenly spaced tones that can be used to transmit data. When transmissions by base stations in overlapping sectors and/or cells use the same tone or set of tones, interference may occur over a period of time due to the operation of base stations in adjacent sectors and/or neighboring cells. This problem is particularly noticeable where transmissions are periodic or nearly periodic.

In periodic or nearly periodic situations, mutual interference caused by base stations in adjacent sectors and/or cells may be highly correlated. For example, when the tones used by a base station A corresponding to a first sector is the same as the tones used by another base station B corresponding to an adjacent sector, in the next transmission period, the tones used by base station A will again be the same as those used by base station B in the case where the tones are assigned using the same function and recur periodically. Correlated interference of this type can cause signals transmitted by the same two base stations to repeatedly interfere with each other over a long period of time. If a wireless terminal is located in the overlapping area between the two base stations, the wireless terminal's receiver may not be able to detect the signals correctly from the downlink signal for a long period of time.

In order to reduce the risk of correlated or prolonged interference it would be beneficial if it was possible to assign tones to the base stations in neighboring sectors and cells in a manner that would minimize the risk of correlated interference.

In view of the above discussion, it becomes apparent that there is a need for minimizing the potential for collisions between transmissions that occur in adjacent cells and neighboring cells of a wireless communications system. It is desirable that the probability that transmissions from any given base station in adjacent sectors or neighboring cells will collide repeatedly be controlled and/or minimized to avoid extended periods where communication signals are blocked for any particular device.

SUMMARY

Methods and apparatus described here are for allocating and using tone subsets for communications purposes in various communications system such as, e.g., in a multi-tone multi-sector, multi-cell communications system. The system may be, for example, an orthogonal frequency division multiplexed (OFDM) system. The OFDM communication system includes a set of tones to transmit data and control signals. A block of strip symbol data is used to communicate information, both at a transmitter and at a receiver. A beacon time reference is identified. An overhead set of repeating time periods, having an overhead signal periodicity related to the beacon time reference is identified. A data payload set of repeating time periods having a data payload periodicity related to the beacon time reference is identified. The overhead set of repeating time periods is divided into a fixed bit-use subset of repeating time periods and a flexible bit use subset of repeating time periods. Data is communicated to a processor or a transmitter based on the fixed bit-use subset of repeating time periods and the flexible bit use subset of repeating time periods.

Further, a first type of fixed bit-use message may be generated. A second type of fixed bit-use message may also be generated. A first period for repeating transmission of the first type of fixed bit-use message may be identified for transmission or communication to a processor. A second period for repeating transmission of the second type of fixed bit-use message may be identified for transmission. The first type of fixed bit-use message may include one of a software version, a system time, an access priority, loading information, carrier configuration, sector configuration, and transmission power. A flexible bit-use message for the flexible bit-use subset of repeating time periods comprises an other carrier loading message. A flexible bit-use message for the flexible bit-use subset of repeating time periods comprises an other sector loading message.

The functions of various embodiments may be implemented using hardware, software or a combination of hardware and software. Further, functions of various embodiments may be stored on machine readable media. Tone allocation charts may be computed once and stored in the base station and/or mobile nodes so that re-computing of the allocation information need not be performed on a continuous basis. In such embodiments, allocation of tones and tone sequences is still performed according to the functions even though the functions are not performed in real time during the allocation process.

While various embodiments have been discussed in the summary above, it should be appreciated that not necessarily all embodiments include the same features and some of the features described above are not necessary but can be desirable in some embodiments. Numerous additional features, benefits and details of the various methods and apparatus of various embodiments are discussed in the detailed description, which follows.

DETAILED DESCRIPTION

The methods and apparatus described for allocating, tone subsets can be used with a wide range of communications systems. For example various features can be used with systems, which support mobile communications devices such as notebook computers equipped with modems, PDAs, and a wide variety of other devices, which support wireless interfaces in the interests of device mobility.

Figure 1:
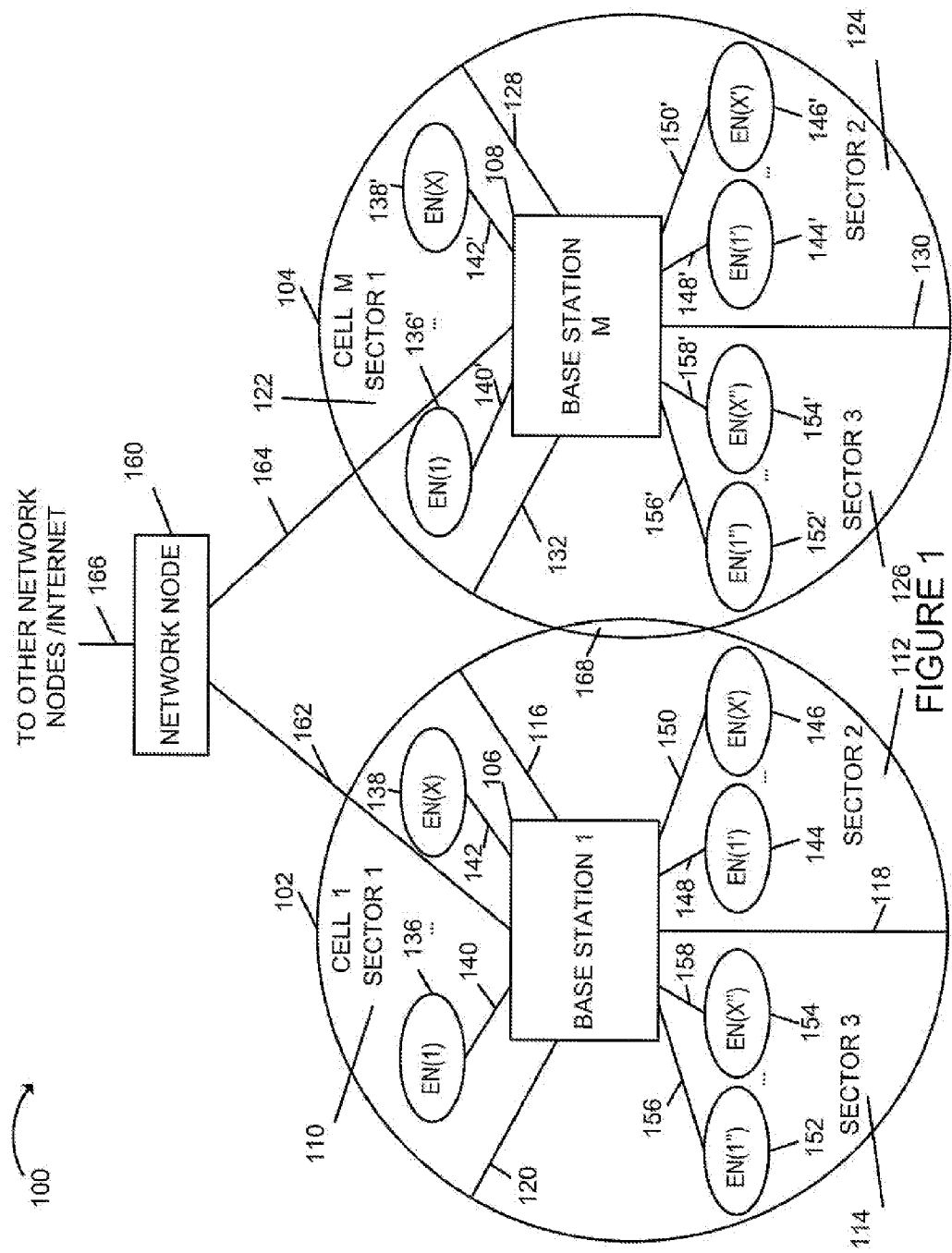
FIG. 1 illustrates a network diagram of an exemplary communications system implemented in accordance with various embodiments.

FIG. 1 shows an exemplary communication system 100 implemented in accordance with various embodiments including multiple cells: cell 1 102, cell M 104. Note that neighboring cells 102, 104 overlap slightly, as indicated by cell boundary region 168, thereby providing the potential for signal interference between signals being transmitted by base stations in neighboring cells. Each cell 102,104 of exemplary system 100 includes three sectors. Cells which have not be subdivided into multiple sectors (N=1), cells with two sectors (N=2) and cells with more than 3 sectors (N>3) are also possible in accordance with various embodiments. Cell 102 includes a first sector, sector 1 110, a second sector, sector 2 112, and a third sector, sector 3 114. Each, sector 110, 112, 114 has two sector boundary regions; each boundary region is shared between two adjacent sectors. Sector boundary regions provide the potential for signal interference between signals being transmitted by base stations in neighboring sectors. Line 116 represents a sector boundary region between sector 1 110 and sector 2 112; line 118 represents a sector boundary region between sector 2 112 and sector 3 114: line 120 represents a sector boundary region between sector 3 114 and sector 1110. Similarly, cell M 104 includes a first sector, sector 1 122, a second sector, sector 2 124, and a third sector, sector 3 126. Line 128 represents a sector boundary region between sector 1122 and sector 2 124; line 130 represents a sector boundary region between sector 2 124 and sector 3 126; line 132 represents a boundary region between sector 3 126 and sector 1 122. Cell 1 102 includes a base station (BS), base station 1 106, and a plurality of end nodes (ENs) in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148,150, respectively; sector 3 114 includes EN(1") 152 and EN(X") 154 coupled to BS 106 via wireless links 156, 158, respectively. Similarly, cell M104 includes base station M108, and a plurality of end nodes (ENs) in each sector 122, 124, 126. Sector 1 122 includes EN(1) 136' and EN(X) 138' coupled to BS M 108 via wireless links 140', 142', respectively; sector 2 124 includes: EN(1') 144' and EN(X') 146' coupled to BS M 108 via wireless links 148', 150', respectively; sector 3 126 includes EN(1") 152' and EN(X") 154' coupled to BS 108 via wireless links 156', 158', respectively. System 100 also includes a network node 160 which is coupled to BS 1 106 and BS M 108 via network links 162, 164, respectively. Network node 160 is also coupled to other network nodes, e.g., other base stations, AAA server nodes, intermediate nodes, routers, etc. and the Internet via network link 166. Network links 162,164,166 may be, e.g., fiberoptic cables. Each end node, e.g. EN 1 136 may be a wireless terminal including a transmitter as well as a receiver. The wireless terminals, e.g., EMI) 136 may move through system 100 and may communicate via wireless links with the base station in the cell in which the EN is currently located. The wireless terminals, (WTs), EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc. Each base station performs tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine the tones that they can use to receive data and information at specific strip-symbol periods. The tone subset allocation sequence is constructed, in accordance with various embodiments to spread the inter-sector and inter-cell interference across each of the tones.

Figure 2:
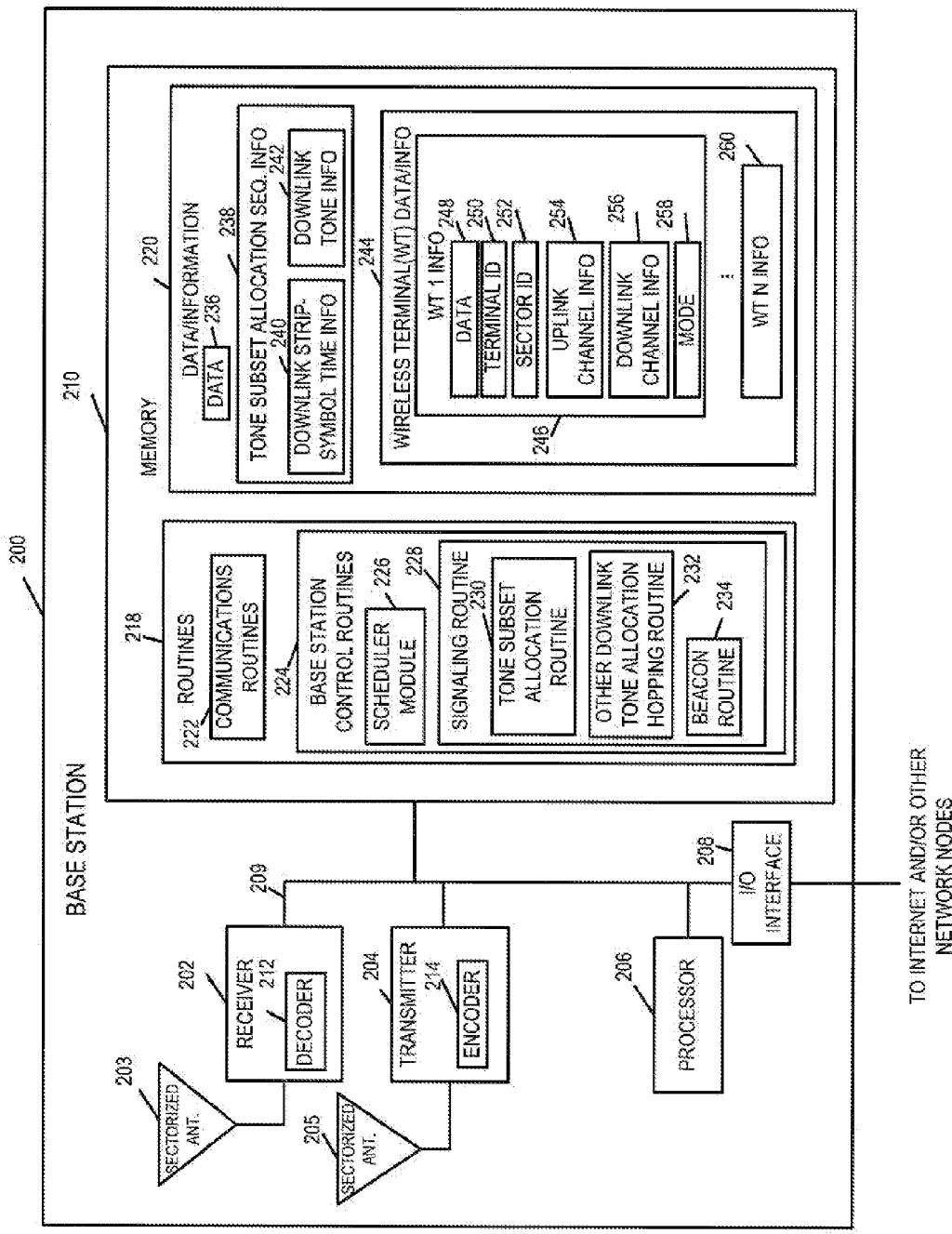
FIG. 2 illustrates an exemplary base station implemented in accordance with various embodiments.

FIG. 2 illustrates an exemplary base station 200 in accordance with various embodiments. Exemplary base station 200 implements the tone subset allocation sequences, with different tone subset allocation sequences generated for each different sector type of the cell. The base station 200 may be used as any one of the base stations 106, 108 of the system 100 of FIG. 1. The base station 200 includes a receiver 202, a transmitter 204, a processor 206, e.g., CPU, an input/output interface 208 and memory 210 which are coupled together by a bus 209 over which the various elements 202, 204, 206, 208, and 210 may interchange data and information.

Sectorized antenna 203 coupled to receiver 202 is used for receiving data and other signals, e.g., channel reports, from wireless terminals transmissions from each sector within the base station's cell. Sectorized antenna 205 coupled to transmitter 204 is used for transmitting data and other signals, e.g., control signals, pilot signal, beacon signals, etc. to wireless terminals 300 (see FIG. 3) within each sector of the base station's cell. In various embodiments, base station 200 may employ multiple receivers 202 and multiple transmitters 204, e.g., an individual receivers 202 for each sector and an individual transmitter 204 for each sector. The processor 206, may be, e.g., a general purpose central processing unit (CPU). Processor 206 controls operation of the base station 200 under direction of one or more routines 218 stored in memory 210 and implements the methods. I/O interface 208 provides a connection to other network nodes, coupling the BS 200 to other base stations, access routers. AAA server nodes, etc., other networks, and the Internet. Memory 210 includes routines 218 and data/information 220.

Data/information 220 includes data 236, tone subset allocation sequence information 238 including downlink strip-symbol time information 240 and downlink tone information 242, and wireless terminal (WT) data/info 244 including a plurality of sets of WT information: WT 1 info 246 and WT N info 260. Each set of WT info, e.g., WT 1 info 246 includes data 248, terminal ID 250, sector ID 252, uplink channel information 254, downlink channel information 256, and mode information 258.

Routines 218 include communications routines 222 and base station control routines 224. Base station control routines 224 includes a scheduler module 226 and signaling routines 228 including a tone subset allocation routine 230 for the strip-symbol periods, other downlink tone allocation hopping routine 232 for the rest of symbol periods, e.g., non strip-symbol periods, and a beacon routine 234.

Data 236 includes data to be transmitted that will be sent to encoder 214 of transmitter 204 for encoding prior to transmission to WTs, and received data from WTs that has been processed through decoder 212 of receiver 202 following reception. Downlink strip-symbol time information 240 includes the frame synchronization structure information, such as the superslot, beaconslot, and ultraslot structure information, and information specifying whether a given symbol period is a strip-symbol period, and if so, the index of the strip-symbol period and whether the strip-symbol is a resetting point to truncate the tone subset allocation sequence used by the base station. Downlink tone information 242 includes information including a carrier frequency assigned to the base station 200, the number and frequency of tones, and the set of tone subsets to be allocated to the strip-symbol periods, and other cell and sector specific values such as slope, slope index and sector type.

Data 248 may include data that WT1 300 has received from a peer node, data that WT 1 300 desires to be transmitted to a peer node, and downlink channel quality report feedback information. Terminal ID 250 is a base station 200 assigned ID that identifies WT 1 300. Sector ID 252 includes information identifying the sector in which WT1 300 is operating. Sector ID 252 can be used, for example, to determine the sector type. Uplink channel information 254 includes information identifying channel segments that have been allocated by scheduler 226 for WT1 300 to use, e.g., uplink traffic channel segments for data, dedicated uplink control channels for requests, power control, timing control, etc. Each uplink channel assigned to WT1 300 includes one or more logical tones, each logical tone following an uplink hopping sequence. Downlink channel information 256 includes information identifying channel segments that have been allocated by scheduler 226 to carry data and/or information to WT1 300, e.g., downlink traffic channel segments for user data. Each downlink channel assigned to WT1 300 includes one or more logical tones, each following a downlink hopping sequence. Mode information 258 includes information identifying the state of operation of WT1 300, e.g. sleep, hold, on.

Communications routines 222 control the base station 200 to perform various communications operations and implement various communications protocols.

Base station control routines 224 are used to control the base station 200 to perform basic base station functional tasks, e.g., signal generation and reception, scheduling, and to implement the steps of the method of some embodiments including transmitting signals to wireless terminals using the tone subset allocation sequences during the strip-symbol periods.

Signaling routine 228 controls the operation of receiver 202 with its decoder 212 and transmitter 204 with its encoder 214. The signaling routine 228 is responsible controlling the generation of transmitted data 236 and control information. Tone subset allocation routine 230 constructs the tone subset to be used in a strip-symbol period using the method of the embodiment and using data/info 220 including downlink strip-symbol time info 240 and sector ID 252. The downlink tone subset allocation sequences will be different for each sector type in a cell and different for adjacent cells. The WTs 300 receive the signals in the strip-symbol periods, in accordance with the downlink tone subset allocation sequences; the base station 200 uses the same downlink tone subset allocation sequences in order to generate the transmitted signals. Other downlink tone allocation hopping routine 232 constructs downlink tone hopping sequences, using information including downlink tone information 242, and downlink channel information 256, for the symbol periods other than the strip-symbol periods. The downlink data tone hopping sequences are synchronized across the sectors of a cell. Beacon routine 234 controls the transmission of a beacon signal, a signal of relatively high power concentrated on one or a few tones, which may be used for synchronization purposes, e.g., to synchronize the frame timing structure of the downlink signal and therefore the tone subset allocation sequence with respect to an ultra-slot boundary.

Figure 3:
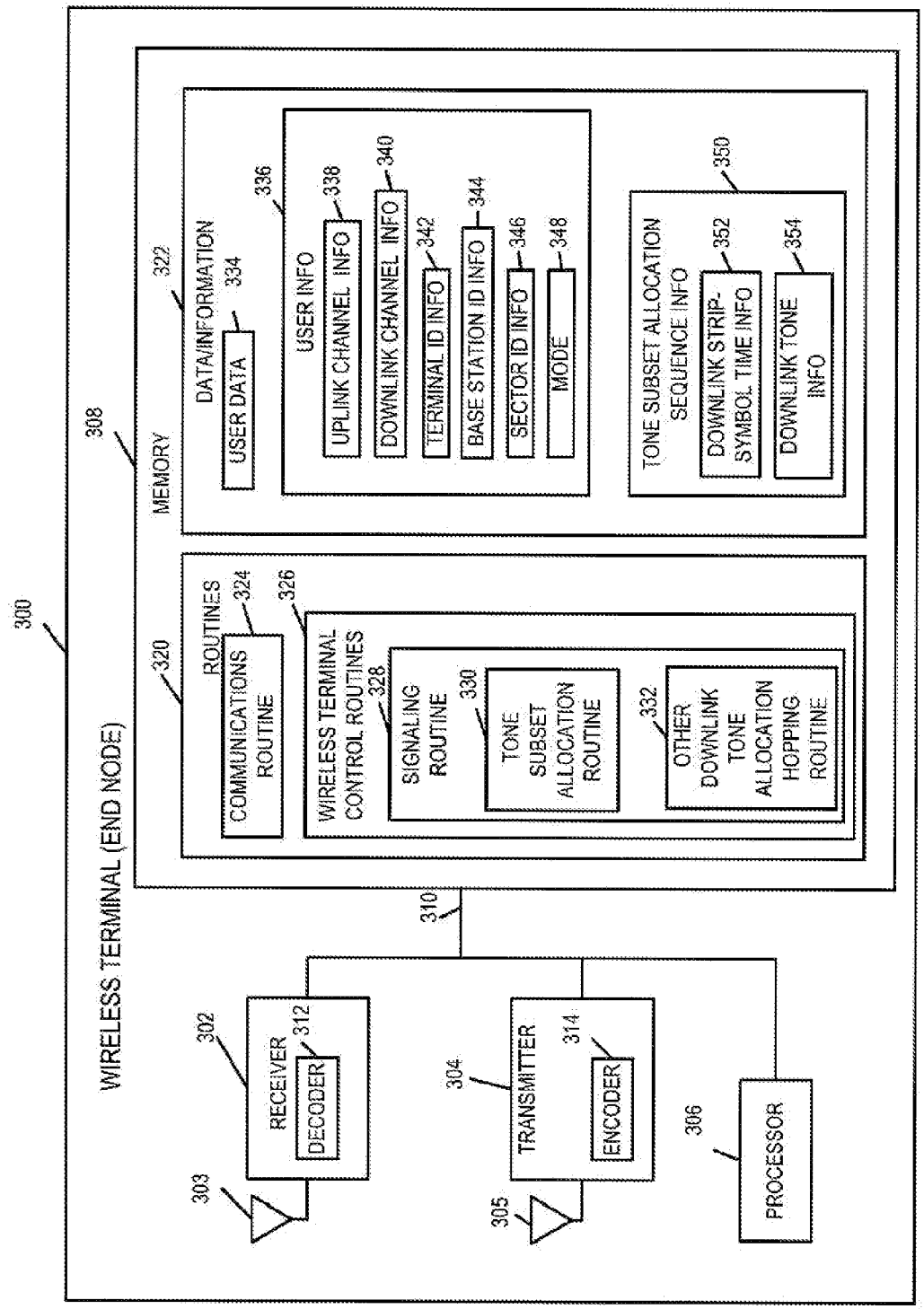
FIG. 3 illustrates an exemplary wireless terminal implemented in accordance with various embodiments.

FIG. 3 illustrates an exemplary wireless terminal (end node) 300 which can be used as any one of the wireless terminals (end nodes), e.g., EN(1) 136, of the system 100 shown in FIG. 1. Wireless terminal 300 implements the tone subset allocation sequences. The wireless terminal 300 includes a receiver 302 including a decoder 312, a transmitter 304 including an encoder 314, a processor 306, and memory 308 which are coupled together by a bus 310 over which the various elements 302, 304, 306, 308 can interchange data and information. An antenna 303 used for receiving signals from a base station 200 is coupled to receiver 302. An antenna 305 used for transmitting signals, e.g., to base station 200 is coupled to transmitter 304.

The processor 306, e.g., a CPU controls the operation of the wireless terminal 300 and implements methods by executing routines 320 and using data/information 322 in memory 308.

Data/information 322 includes user data 334, user information 336, and tone subset allocation sequence information 350. User data 334 may include data, intended for a peer node, which will be routed to encoder 314 for encoding prior to transmission by transmitter 304 to base station 200, and data received from the base station 200 which has been processed by the decoder 312 in receiver 302. User information 336 includes uplink channel information 338, downlink channel information 340, terminal ID information 342, base station ID information 344, sector ID information 346, and mode information 348. Uplink channel information 338 includes information identifying uplink channels segments that have been assigned by base station 200 for wireless terminal 300 to use when transmitting to the base station 200. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 340 includes information identifying downlink channel segments that have been assigned by base station 200 to WT 300 for use when BS 200 is transmitting data/information to WT 300. Downlink channels may include downlink traffic channels and assignment channels, each downhill(channel including one or more logical tone, each logical tone following a downlink hopping sequence, which is synchronized between each sector of the cell.

User info 336 also includes terminal ID information 342, which is a base station 200 assigned identification, base station ID information 344 which identifies the specific base station 200 that WT has established communications with, and sector ID info 346 which identifies the specific sector of the cell where WT 300 is presently located. Base station ID 344 provides a cell slope value and sector ID info 346 provides a sector index type; the cell slope value and sector index type may be used to derive tone hopping sequences. Mode information 348 also included in user info 336 identifies whether the WT 300 is in sleep mode, hold mode, or on mode.

Tone subset allocation sequence information 350 includes downlink strip-symbol time information 352 and downlink tone information 354. Downlink strip-symbol time information 352 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 354 includes information including a carrier frequency assigned to the base station 200, the number and frequency of tones, and the set of tone subsets to be allocated to the strip-symbol periods, and other cell and sector specific values such as slope, slope index and sector type.

Routines 320 include communications routines 324 and wireless terminal control routines 326. Communications routines 324 control the various communications protocols used by WT 300. Wireless terminal control routines 326 controls basic wireless terminal 300 functionality including the control of the receiver 302 and transmitter 304. Wireless terminal control routines 326 include the signaling routine 328. The signaling routine 328 includes a tone subset allocation routine 330 for the strip-symbol periods and an other downlink tone allocation hopping routine 332 for the rest of symbol periods, e.g., non strip-symbol periods. Tone subset allocation routine 330 uses user data/info 322 including downlink channel information 340, base station ID info 344, e.g., slope index and sector type, and downlink tone info 354 in order to generate the downlink tone subset allocation sequences in accordance with some embodiments and process received data transmitted from base station 200. Other downlink tone allocation hopping routine 330 constructs downlink tone hopping sequences, using information including downlink tone information 354, and downlink channel information 340, for the symbol periods other than the strip-symbol periods. Tone subset allocation routine 330, when executed by processor 306, is used to determine when and on which tones the wireless terminal 300 is to receive one or more strip-symbol signals from the base station 200. The uplink tone allocation hopping routine 330 uses a tone subset allocation function, along with information received from the base station 200, to determine the tones in which it should transmit on.

Figure 4:
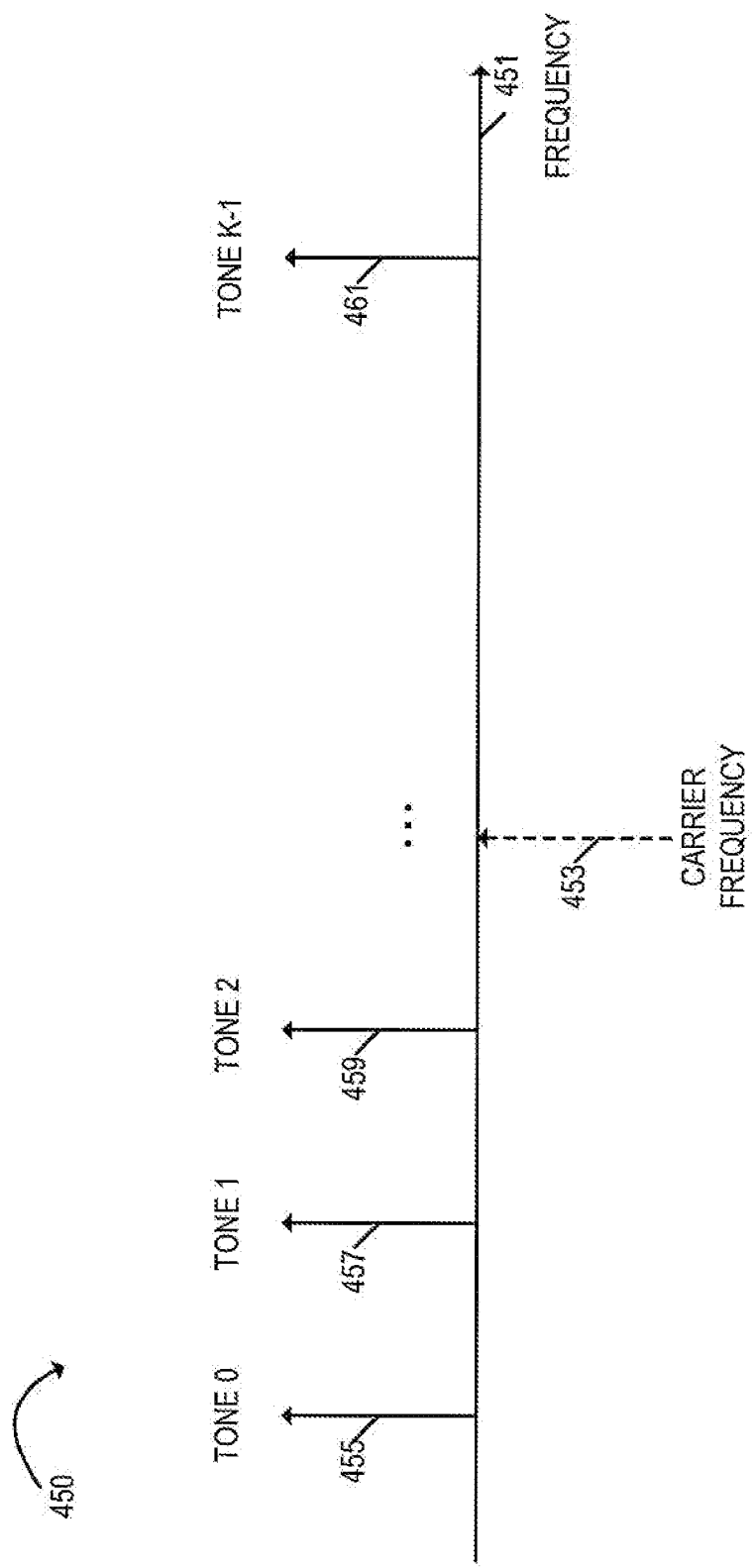
FIG. 4 illustrates an exemplary tone set used in an OFDM system.

FIG. 4 illustrates the OFDM spread spectrum air interface technology of various embodiments, implemented for each sector of each of the cells (102,104) of FIG. 1. In FIG. 4, horizontal axis 451 represents frequency. The total amount of available bandwidth for a particular carrier frequency 453, e.g., for downlink signaling, is divided into a number, K, of equally spaced tones. In some embodiments, there are 113 equally spaced tones. These tones are indexed from 0 to K−1. Exemplary tones: tone 0 455, tone 1 457, tone 2 459, and tone K−1 461 are illustrated in FIG. 4. The bandwidth is used simultaneously each of the sectors 110, 112, 114, 122, 124, 126 comprising the two cells 102,104. In each sector of each cell, the tones, 0 through K−1, are used in each sector of each cell respectively to transmit downlink signals. Since the same bandwidth is used in each sector of both the cells 102,104, the signals transmitted by different cells and sectors on the frequency tones at the same time may interfere with each other, e.g., in the overlapping coverage areas, e.g. sector boundary areas 116, 118, 120, 128, 130, 132, and cell boundary areas 168.

Figure 5:
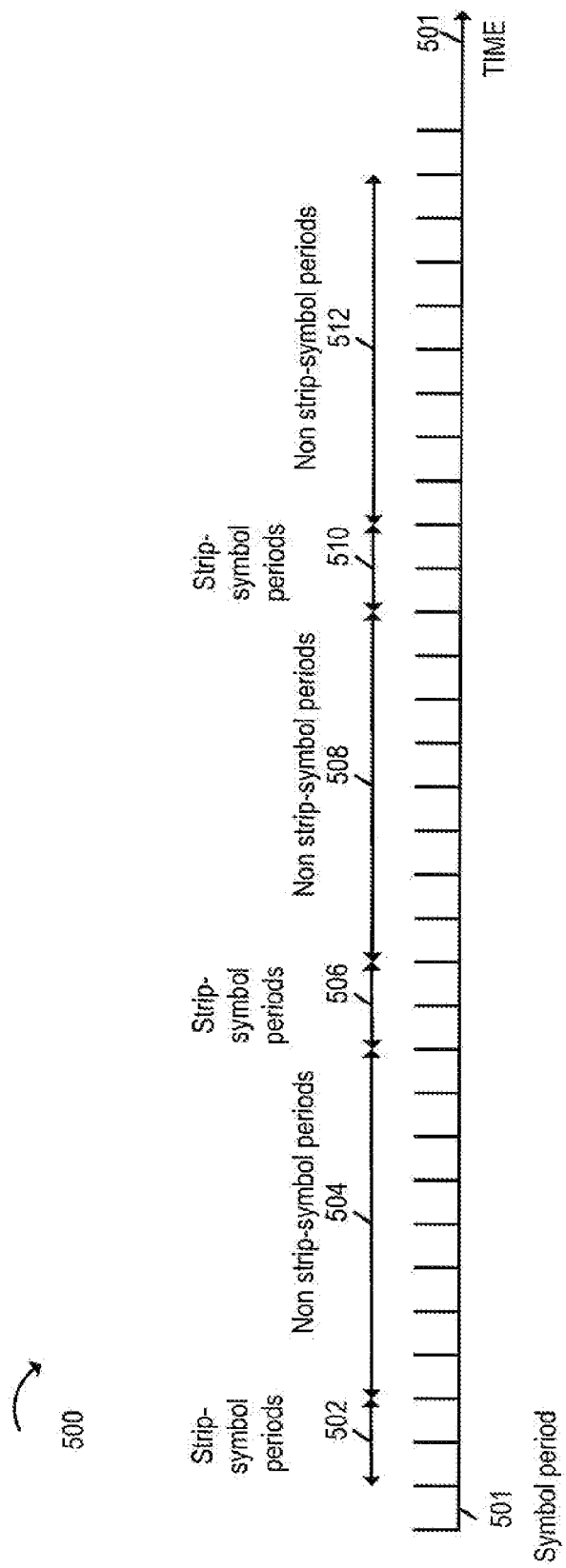
FIG. 5 illustrates an exemplary signal frame structure showing the strip-symbol periods and non strip-symbol periods in accordance with various embodiments.

FIG. 5 illustrates an exemplary signal frame structure showing the strip-symbol periods and non strip-symbol periods in accordance with various embodiments, implemented for each sector of each of the cells (102,104) of FIG. 1. In FIG. 5, horizontal axis 501 represents time. A unit in the time axis 501 represents a symbol period, e.g., an OFDM symbol period in an OFDM communication system. In each symbol period, the set or a subset of the K tones shown in FIG. 4 are used to transmit the downlink signal from the base station 200 to the wireless terminal 300. The allocation of the tones for the purpose of transmitting the downlink signal may follow different allocation methods or algorithms in different symbol periods. In the exemplary embodiment, there are two different tone allocation methods. In the first tone allocation method, only a subset of the K tones are used in a symbol, and the subset is selected from a fixed set of tone subsets according to a predetermined schedule sequence. Symbols in which the first tone allocation method is used for allocating tones are called the strip-symbols, e.g., 502, 506, and 510 shown in FIG. 5. In the second tone allocation method, tone hopping sequences are used to determine the physical tones corresponding to the logical tones, and the tone allocation is done by allocating the logical tones. Symbols in which the second tone allocation method is used for allocating tones are called the non strip-symbols, e.g., 504, 508, and 512 shown in FIG. 5. In general, the set of the tones used in a non strip-symbol period does not come from a fixed set of tone subsets according to a predetermined schedule sequence. Note that in various embodiments there may be other symbol periods besides the strip-symbols and the non strip-symbols, e.g., symbol periods in which the beacon signals are transmitted.

Figure 6:
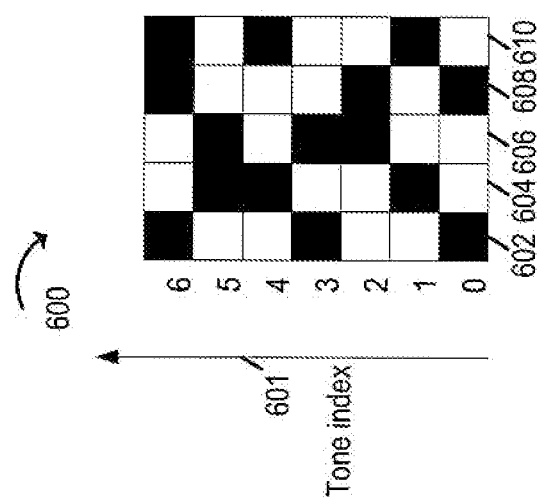
FIG. 6 illustrates an exemplary set of tone subsets to be used by the base station transmitter in accordance with various embodiments.

FIG. 6 illustrates an exemplary set of tone subsets to be used by the base station transmitter in accordance with various embodiments. For the sake of simplifying the illustration, the total number of tones is equal to 7. In the exemplary embodiment, the total number of tones can be 113. The vertical axis 601 represents the index of the tones. Tone index increases from 0 to 6. Each column represents a subset of tones to be used in a strip symbol. In each column, the darkened box represents that the corresponding tone is included in a given tone subset. For example, the tone subset in column 602 includes tones 0, 3, 6; the tone subset in column 604 includes tones 1, 4, 5; the tone subset in column 606 includes tones 2, 3, 5; the tone subset in column 608 includes tones 0, 2, 6; the tone subset in column 610 includes tones 1, 4, 6. In the illustration, there are N=5 tone subsets in total. In the illustration, the number of tones included in each tone subset is the same and equal to 3.

In general, the number of tones in each tone subset can be the same or different. In accordance with various embodiments, the difference between the numbers of tones in any two tone subsets is at most 20% of the number of tones in either tone subset. In accordance with various embodiments, the number of tones included in a tone subset is close to the half of the total number of the tones. For example, the difference between the number of tones included in a tone subset and the half of the total number of the tones is at most 20% of the half of the total number of the tones.

Figure 7:
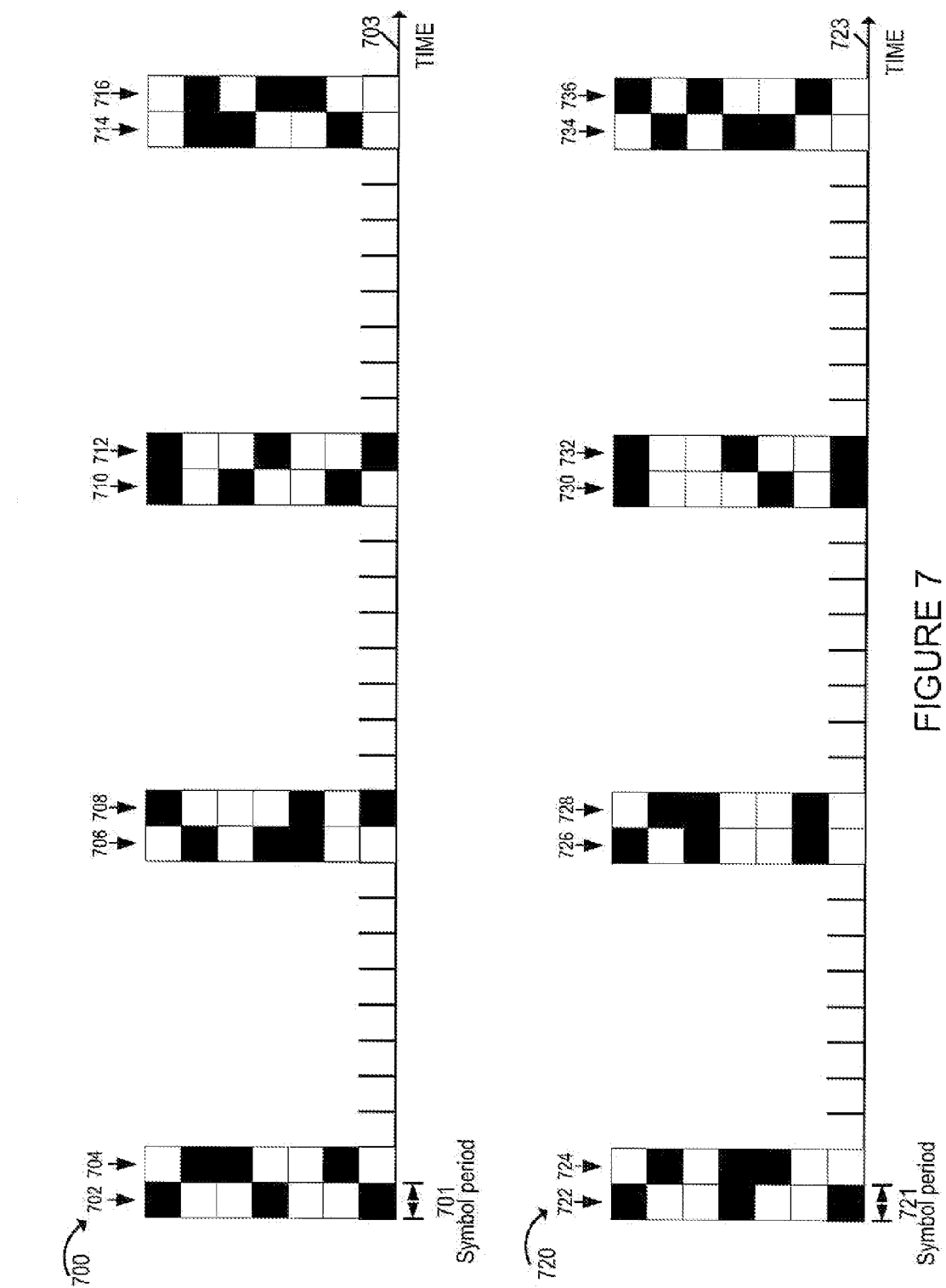
FIG. 7 illustrates two exemplary tone subset allocation sequences to be used by two transmitters, respectively in accordance with various embodiments.

FIG. 7 illustrates two exemplary tone subset allocation sequences to be used by two base station transmitters, respectively in accordance with various embodiments. The illustration 700 is the tone subset allocation sequence used by a first transmitter and the illustration 720 is the tone subset allocation sequence used by a second transmitter.

In illustration 700, the horizontal axis 703 represents time, and each unit in the time axis 701 represents a symbol period. The use of the tones in a strip-symbol is shown with a vertical column. Although the use of the tones in other symbol periods is not shown in the figure, it is understood that the tones are used according to certain tone allocation and/or hopping methods. Illustration 700 shows that in a strip-symbol, the tones included in a fixed tone subset are used to transmit the downlink signal. The set of tone subsets used in illustration 700 is the one shown in FIG. 6, which consists of N=5 distinct tone subsets. Those tone subsets are indexed as 0 (for 602), 1 (for 604), 2 (for 606), 3 (for 608) and 4 (for 610). The tone subsets are selected from the set of tone subsets according to a predetermined schedule, which is the tone subset allocation sequence. Specifically, tone subset 0 is used in strip-symbol 702; tone subset 1 is used in strip-symbol 704; tone subset 2 is used in strip-symbol 706; tone subset 3 is used in strip-symbol 708; tone subset 4 is used in strip-symbol 710. After strip-symbol 710, the tone subset allocation sequence repeats. So, the tone subset 0 is used in strip-symbol 712; the tone subset 1 is used in strip-symbol 714; the tone subset 2 is used in strip-symbol 716, and so on.

In illustration 720, the horizontal axis 723 represents time, and each unit in the time axis 721 represents a symbol period. The use of the tones in a strip-symbol is shown with a vertical column. Although the use of the tones in other symbol periods is not shown in the figure, it is understood that the tones are used according to certain tone allocation and/or hopping methods. Illustration 720 shows that in a strip-symbol, the tones included in a fixed tone subset are used to transmit the downlink signal. The set of tone subsets used in illustration 720 is the same one used in illustration 700. The tone subsets are selected from the set of tone subsets according to a predetermined schedule, which is the tone subset allocation sequence. The tone subset allocation sequence used in the second base station is different from that used in the first base station. Specifically, tone subset 0 is used in strip-symbol 722; tone subset 2 is used in strip-symbol 724; tone subset 4 is used in strip-symbol 726; tone subset 1 is used in strip-symbol 728; tone subset 3 is used in strip-symbol 730. After strip-symbol 730, the tone subset allocation sequence repeats. So, the tone subset 0 is used in strip-symbol 732; the tone subset 2 is used in strip-symbol 734; the tone subset 4 is used in strip-symbol 736, and so on. The period of the tone subset allocation sequence used in the second base station is the same as that used in the first base station. The period is equal to the number of tone subsets in the set. Preferably, the number of tone subsets in the set is a prime, for example, N=97.

In the above illustrations 700 and 720, the two base stations use the same tone subset in strip-symbols 702 and 722. When the two strip-symbols are aligned, then the two base stations in effect use the same tones to transmit their downlink signals, thereby creating strong correlated interference between them. Advantageously, as the tone subset allocation sequences are different in accordance with various embodiments, the two base stations use different tone subsets in the subsequent strip-symbol, thereby avoiding the interference being persistently strong. Note that the two base stations are not necessarily completely time synchronized with each other.

Figure 8:
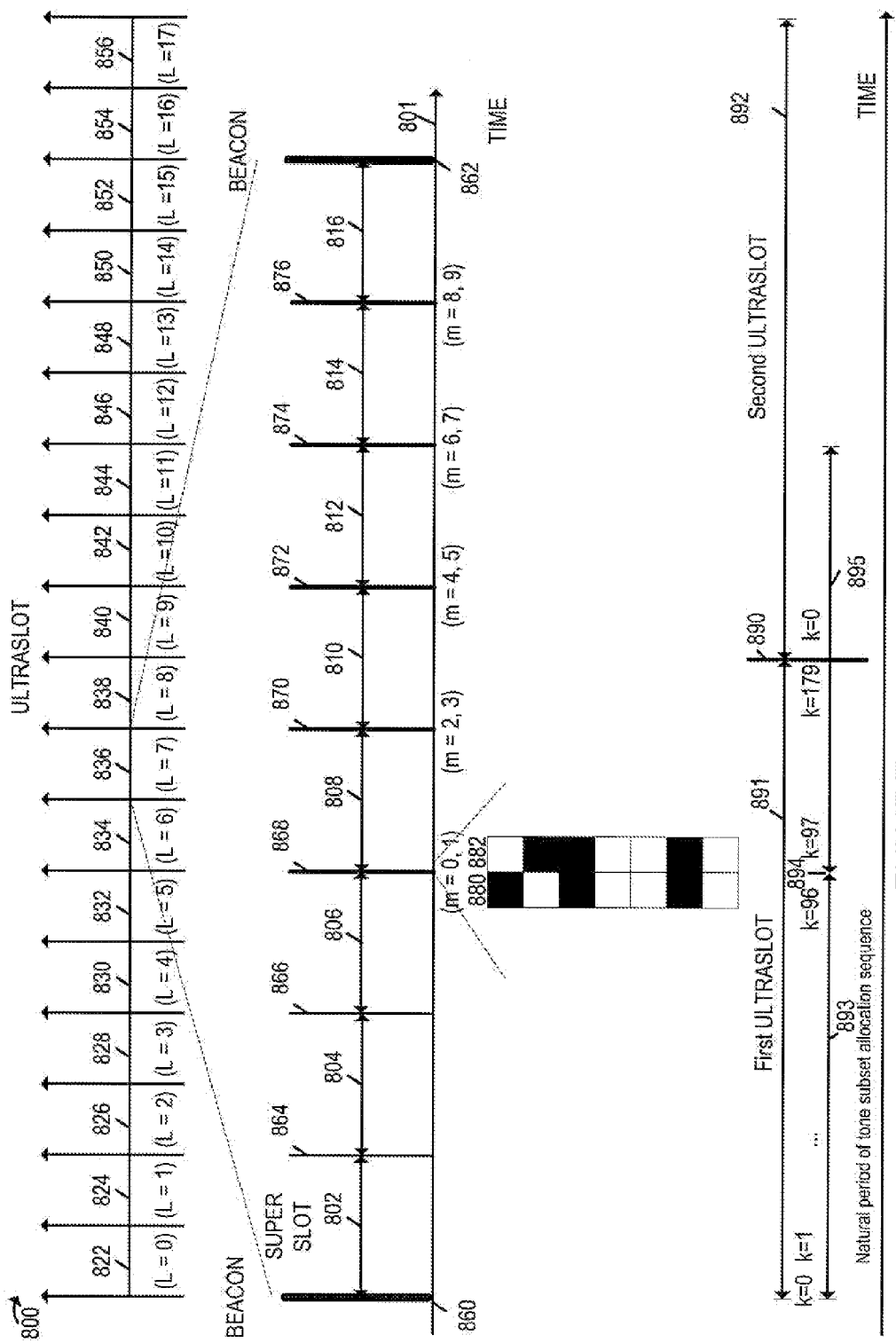
FIG. 8 illustrates the operation of truncating the tone subset allocation sequences to fit with the frame synchronization structure in accordance with various embodiments.

FIG. 8 illustrates the operation of truncating the tone subset allocation sequences to fit with the frame synchronization structure in accordance with various embodiments. In the illustrations shown in FIG. 7, the tone subset allocation sequence runs one period after another. In some embodiment, in order to be aligned with another frame synchronization structure in the downlink signal, the tone subset allocation sequence is truncated and restarted. FIG. 8 shows an exemplary frame synchronization structure, including superslots, beaconslots, and ultraslots. A superslot includes a fixed number of symbols, e.g., 114 consecutive OFDM symbol transmission time intervals. Certain downlink tone hopping sequences have a periodicity of a superslot. A beaconslot includes a fixed number of superslots, e.g., 8 consecutive indexed superslots. In one embodiment, a beacon signal is transmitted in a beaconslot. An ultraslot includes a fixed number of beaconslots, e.g., 18 consecutive indexed beaconslots.

In FIG. 8, ultraslot 800 includes 18 beaconslots, 822, 824, 826, 828, 830, 832, 834, 836, 838, 840, 842, 844, 846, 848, 850, 852, 854, 856. Those beaconslots are indexed as L=0, 1, 2, 3, 4, 5, 6, 7, 8, 9, 10, 11, 12, 13, 14, 15, 16, 17 respectively. A beaconslot, e.g., beaconslot 836, includes 8 superslots, 802, 804, 806, 808, 810, 812, 814, 816. Special symbols are transmitted in the beginning of each superslot. For example, in superslot 802, the first two symbols 860 are used to transmit a beacon signal, in superslots 804 and 806, the first two symbols 864 and 866 are not transmitted. In superslots 808, 810, 812, 814, 816, the first two symbols 868, 870, 872, 874, and 876 are strip-symbols, e.g., used to send broadcast and/or control information. A superslot may include other symbols beside the first two special symbols, e.g., 112 OFDM symbols used to convey data/information including user data included in downlink traffic channel segments. The timing structure of a beaconslot repeats. For example, the two symbols 862 are used to transmit a beacon signal, similar to the first two symbols 860.

The strip-symbols in a beaconslot of the exemplary embodiment of FIG. 8 are indexed as m=0.1, . . . , 9. For example, the first strip-symbol 880 in the beaconslot is indexed as m=0 and the second strip-symbol 882 in the beaconslot is indexed as m=1.

In the exemplary embodiment, the tone subset allocation sequence is given as follows.

Let f (bssSlopeIndex, bssSectorType, k)=(bssSlopeIndex+1)/(bssSectorType*k+k$^2$) represents the index of the tone subset to be selected in strip-symbol k, where all the arithmetic operators (+, $_2$, *, /) are defined in the field of N, where N is a prime number. For example, N=97.

bssSlopeIndex=the index of the cell slope value, and is preferably the same for each of the sectors of the cell; adjacent cells should have different values for the bssSlopeIndex. Parameter bssSlopeIndex is equal to 0, 1, . . . , $N_1$–1, where $N_1 \leq N$. In one embodiment, $N_1$=96.

bssSectorType=index of the sector. Assume sector type T is in the set {0, 1, . . . , 5}, {0,1} or {0,1,2}; adjacent sectors in a given base station should have different values of T.

f=a particular function in a sector of a base station.

k=an index of strip-symbol period, k=L*10+m

Expressed in a slightly different format;

$$k=L*10+m;$$

$$temp0=bssSectorType*k+k*k;$$

$$temp1=imod(temp0,N);$$

$$f(bssSlopeIndex,bssSectorType,k)=mod(temp1*(bssSlopeIndex+1),N);$$

where for integers x and m, the modulo function mod(x, m) is defined as mod(x, m)=x−m*floor(x/m) where the function floor(x) is defined as the largest integer less than or equal to x; for integers x and m, the inverse modulo function imod(x, m) is equal to y, where $1 \leq y \leq m$, if mod(x*y, m) is equal to 1. If mod(x, m) is zero, then imod(x, m) is set to 0.

If one allows the time index k goes from 0 to infinity, then the above tone subset allocation sequence has a natural period of N strip-symbols.

However, to fit with the frame timing structure of the downlink signal, k runs from 0 to P−1, where P=180 in the exemplary embodiment. In other words, the tone subset allocation sequence runs for k=0 to k=96 (=N−1) for a first natural period, and starts again from k=97. Before the second natural period ends naturally at k=193 (2*N−1), the time index stops at k=179 and resets to k=0. As a result, the second period is truncated and the tone subset allocation sequence restarts from the beginning.

This is illustrated in the lower part of FIG. 8. A first ultraslot 891 and a second ultraslot 892 are next to each other. Time instant 890 is the boundary between the two ultraslots. The tone subset allocation sequence starts from the beginning of the first ultraslot 891 where k=0, and completes a first natural period 893 of the sequence in time instant 894 where k=96, which is located within the first ultraslot 891. The tone subset allocation sequence continues to start a second period from k=97. The second period 895 would complete in a time instant after the first ultraslot ends. However, k is reset when the first ultraslot ends and the second ultraslot starts at time instant 890, when the second period 895 is truncated and the tone subset allocation sequence is restarted from k=0 rather than continue to complete the second period 895.

The above frame timing structure of ultraslots, beaconslots, superslot, etc. repeats every ultraslot.

Figure 9:
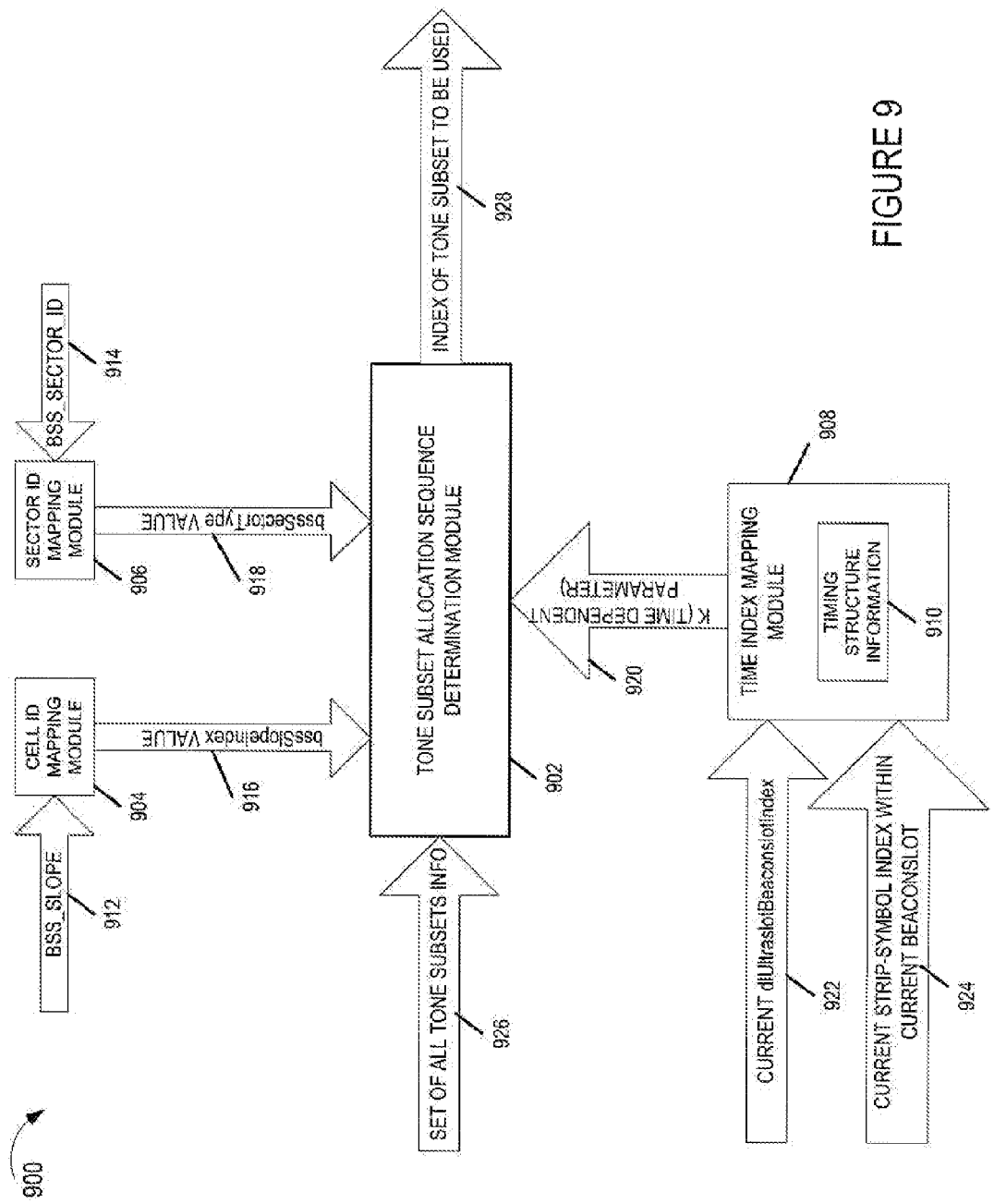
FIG. 9 is a drawing of an exemplary tone subset allocation module implemented in accordance with various embodiments.

FIG. 9 is a drawing of an exemplary tone subset allocation module 900 implemented in accordance with various embodiments. A base station is a network access point for a wireless terminal to obtain network connectivity through the air interface. A base station includes one or multiple Base Station Sectors (BSSs). A BSS is a part of a base station. An omni BSS provides service to wireless terminals in the entire cell corresponding to the base station. A directional BSS may use antennas of a particular direction to communicate with wireless terminals in a subset portion of the cell, e.g., a sector of the cell.

Module 900 may be included as part of a base station or wireless terminal and is used to determine the tone subset allocation pattern that should be used within a sector of a cell corresponding to a BSS. Exemplary tone subset allocation module 900 includes a tone subset allocation determination module 902, a cell identification mapping module 904, a sector identification mapping module 906, and a time index mapping module 908.

A BS may have a BS identifier associated with a BSS_slope 912. Different sectors of a cell will, in some embodiments, use the same BSS_slope 912. A given BSS in the communications system has a corresponding BSS_slope 912, and a BSS_sector_ID 914. The cell ID mapping module 904 maps the BSS_slope 912 to a bssSlopeIndex value 916. Multiple BSSs corresponding to the same cell will have the same value for bssSlopeIndex. Adjacent cells will have different values of bssSlopeIndex.

The cell ID mapping module 904 performs the conversion from BSS_slope 912 to bssSlopeIndex value 916, e.g., via a look up table. In some embodiments, the set of valid bssSlopeIndex are integer values within the range of 0:95.

A BSS also has an associated BSS_sector_identifier 914. Each sector of the cell has a different BSS_sector_ID 914. Different BSSs of the same BS may have the same bssSectorType 918. However, adjacent BSSs of the same BS, in a preferred embodiment, do not have the same bssSectorType. The sector ID mapping module 906 maps the BSS_sector_ID 914 to a bssSectorType value 918. In some embodiments, the bssSectorType value=mod (BSS_sector_ID, 3). In some such embodiments, the BSS_sector_ID is an integer value in the range 0 to 5, while the bssSectorType is an integer value in the range 0 to 2.

In some embodiments, for a given BSS in the communications system, the values for bssSlopeIndex 916 and bssSectorType 918 are fixed and do not vary with time.

In some such embodiments, a wireless terminal which desires to use a BSS as its attachment point determines the bssSlopeIndex value and bssSectorType value corresponding to the BSS, and then uses these values to calculate the tone subset allocation sequences.

Time index mapping module 908 includes timing structure information 910. The timing structure information 910 identifies the downlink structure information associated with each BSS, e.g., OFDM symbol timing, and various grouping of OFDM symbols such as superlots, beacon slots, ultra slots, etc, as well as indexing information associated with the groupings. The timing structure information 910 also determines whether an OFDM symbol is a strip-symbol. The time index mapping module 908 receives a current downlink dlUltraslotBeaconindex value 922 and a current strip symbol index within the current beaconslot value 924 and determines a time dependent value k 920. For example k may be an integer value in the range of 0 to 179. The current dlUltrastotBeaconindex value 922 identifies the current beaconslot index within the current ultraslot within the downlink timing structure corresponding to the BSS. In some embodiments, the value of dlUltraslotBeaconIndex are integer values ranging from 0 to 17. The current strip-symbol index within the current beaconslot value 924 identifies the current strip-symbol within the current beaconslot within the downlink timing structure. In some embodiments, the value of the index 924 ranges from 0 to 9.

The tone subset allocation sequence determination module 902 receives control inputs bssSlopeIndex value 916, bssSectorType value 918 and time index k value 920. Determination module 902 determines a corresponding index of the tone subset 928, which is to be used in the current strip-symbol. In some embodiments, the index is an integer value in the range from 0 to 96.

In some embodiments, the time index mapping module 908 determines k using the equation k=L*10+m, where L is the dlUltraslotBeaconslotIndex, an integer value in the range from 0 to 17, and in is the index of the current strip-symbol in the current beaconslot, an integer value in the range from 0 to 9. In some such embodiments, the tone subset allocation sequence determination module 902 uses the equation f (bssSlopeIndex, bssSectorType, k)=mod(temp1*(bssSlopeIndex+1),97), where temp1=imod(temp0,97); where temp0=bssSectorType*k+k*k.

Figures 10, 10A:
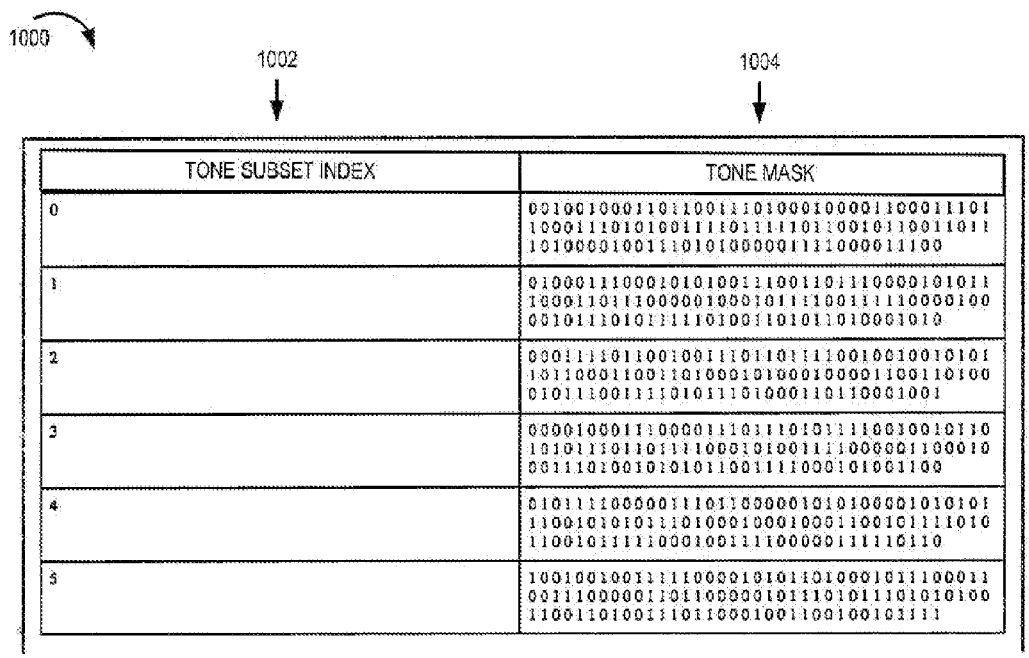
FIG. 10 comprising the combination of FIGS. 10A, 10B, 10C, 10D, 10E, 10F and 10G is a table of a composite of exemplary tone subsets in an exemplary embodiment, the tone subsets being allocated for use in strip symbol intervals.
Figure 10B:
Figure 10F:
Figure 10G:
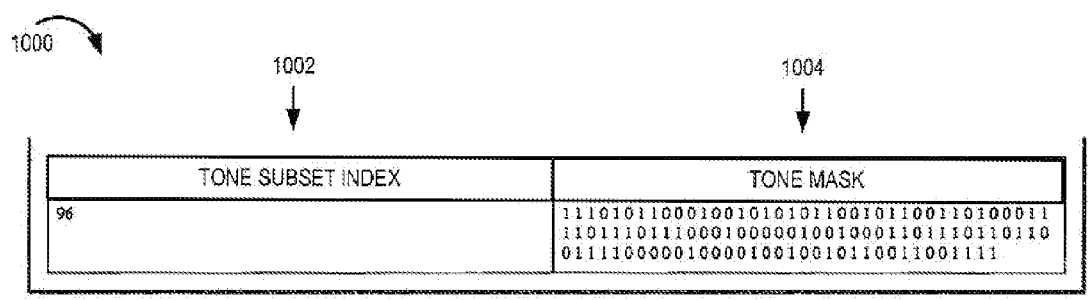

FIG. 10 comprising the combination of FIGS. 10A, 10B, 10C, 10D, 10E, 10F and 10G is a table 1000 of a set of exemplary tone subsets in an exemplary embodiment, the tone subsets being allocated for use in strip symbol intervals. First column 1002 includes tone subset index which ranges from 0 to 96. Second column 1004 includes the tone mask corresponding to each tone subject index value. A tone subject index value to be used for a given OFDM strip symbol is determined, e.g., by tone subset allocation sequence determination module 902. In this exemplary embodiment a downlink tone block corresponding to abuse station sector attachment point uses 113 OFDM tones. The tone mask identifies which tones are to be used in the tone subset. Each entry corresponding to a tone subset index lists 113 values, each value corresponding to an indexed tone of the set of 113 tones in the downlink tone block. If a value is 0, the tone is not used if a value is 1 the tone is used. For example, consider tone subset with index=0, tones with index values=2, 5, 9, 10, 12, 13, 16, 17, 18, 20, 24, 29, 30, 34, 35, 36, 38, 39, 43, 44, 45, 47, 49, 52, 53, 54, 55, 57, 58, 59, 60, 61, 63, 64, 67, 69, 70, 73, 74, 76, 77, 78, 80, 85, 88, 89, 90, 92, 94, 100, 101, 102, 103, 108, 109, 110 are used, while tones with index values 0, 1, 3, 4, 6, 7, 8, 11, 14, 15, 19, 21, 22, 23, 25, 26, 27, 28, 31, 32, 33, 37, 40, 41, 42, 46, 48, 50, 51, 56, 62, 65, 66, 68, 71, 72, 75, 79, 81, 82, 83, 84, 86, 87, 91, 93, 95, 96, 97, 98, 99, 104, 105, 106, 107, 111 and 112 are unused. In some embodiment, the DC tone, e.g., center tone in the tone block with tone index=56 is left unused even if the tone mask indicates that it should be used.

Figure 11:
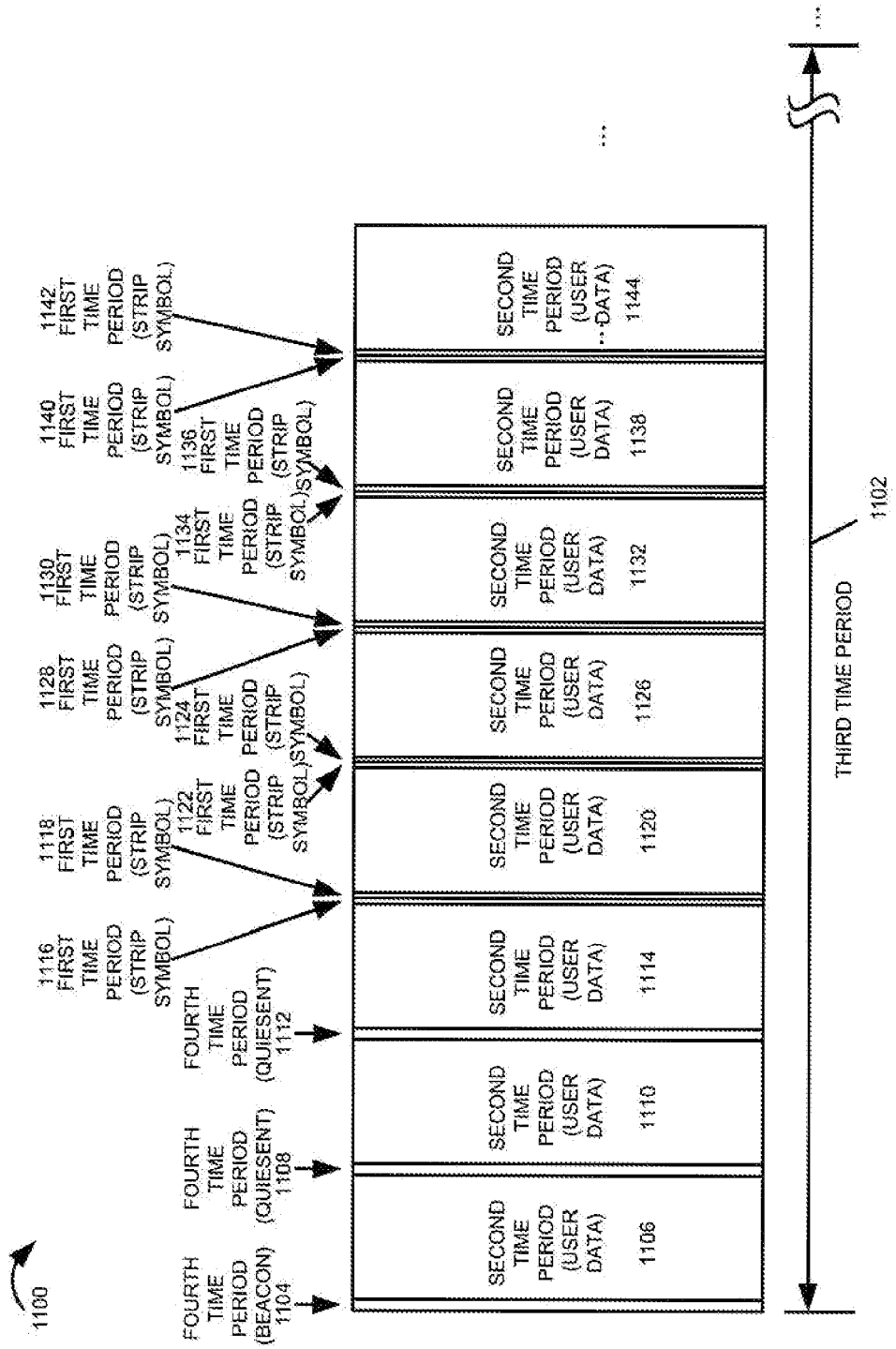
FIG. 11 is a drawing illustrating an exemplary recurring timing structure with respect to usage of a downlink tone block associated with a base station attachment point in accordance with various embodiments.

FIG. 11 is a drawing 1100 illustrating an exemplary recurring timing structure with respect usage of a downlink tone block associated with a base station attachment point in accordance with various embodiments. The exemplary timing structure includes an exemplary recurring third time period 1102.

Exemplary third time period 1102 includes, in sequential order, exemplary time periods (1104, 1106, 1108, 1110, 1112, 1114, 1116, 1118, 1120, 1122, 1124, 1126, 1128, 1130, 1132, 1134, 1136, 1138, 1140, 1142, 1144). Exemplary fourth time period 1104 is scheduled to be used for conveying a beacon signal. Exemplary second time period 1106 is scheduled to be used for conveying user data. Exemplary fourth time period 1108 is scheduled to left unused. Exemplary second time period 1110 is scheduled to be used for conveying user data. Exemplary fourth time period 1112 is scheduled to be left unused. Exemplary second time period 1114 is scheduled to be used for conveying user data. Exemplary first time period 1116 scheduled to be used for conveying broadcast control information using a determined non-null tone sub-subset and scheduled to convey null tones on a determined null tone subset, the tone subsets being determined according to a tone subset hopping sequence. Exemplary first time period 1118 scheduled to be used for conveying broadcast control information using a determined non-null tone sub-subset and scheduled to convey null tones on a determined null tone subset, the tone subsets being determined according to a tone subset hopping sequence. Exemplary second time period 1120 is scheduled to be used for conveying user data. Exemplary first time period 1122 is scheduled to be used for conveying broadcast control information using a determined non-null tone sub-subset and scheduled to convey null tones on a determined null tone subset, the tone subsets being determined according to a tone subset hopping sequence. Exemplary first time period 1124 is scheduled to be used for conveying broadcast control information using a determined non-null tone sub-subset and scheduled to convey null tones on a determined null tone subset, the tone subsets being determined according to a tone subset hopping sequence. Exemplary second time period 1126 is scheduled to be used for conveying user data. Exemplary first time period 1128 is scheduled to be used for conveying broadcast control information using a determined non-null tone sub-subset and scheduled to convey null tones on a determined null tone subset, the tone subsets being determined according to a tone subset hopping sequence. Exemplary first time period 1130 is scheduled to be used for conveying broadcast control information using a determined non-null tone sub-subset and scheduled to convey null tones on a determined null tone subset, the tone subsets being determined according to a tone subset hopping sequence. Exemplary second time period 1132 is scheduled to be used for conveying user data. Exemplary first time period 1134 is scheduled to be used for conveying broadcast control information using a determined non-null tone sub-subset and scheduled to convey null tones on a determined null tone subset, the tone subsets being determined according to a tone subset hopping sequence. Exemplary first time period 1136 is scheduled to be used for conveying broadcast control information using a determined non-null tone sub-subset and scheduled to convey null tones on a determined null tone subset, the tone subsets being determined according to a tone subset hopping sequence. Exemplary second time period 1138 is scheduled to be used for conveying user data. Exemplary first time period 1140 is scheduled to be used for conveying broadcast control information using a determined non-null tone sub-subset and scheduled to convey null tones on a determined null tone subset, the tone subsets being determined according to a tone subset hopping sequence. Exemplary first time period 1142 is scheduled to be used for conveying broadcast control information using a determined non-null tone sub-subset and scheduled to convey null tones on a determined null tone subset, the tone subsets being determined according to a tone subset hopping sequence. Exemplary second time period 1144 is scheduled to be used for conveying user data.

In one exemplary embodiment the third time period corresponds to an ultraslot, a fourth time period corresponds to an interval of two consecutive OFDM symbol transmission time periods in which one of a beacon signal transmission and an intentional transmitter downlink tone block non-transmission is scheduled to occur, and a first type time interval corresponds to a single OFDM symbol wide interval scheduled for transmission of a strip symbol conveying non-beacon broadcast control signals. Successive first time periods in the recurring structure use different tone subsets to convey the broadcast control signals in accordance with a first tone set hopping sequence.

For example, in one exemplary embodiment of FIG. 8, an ultraslot includes 16416 consecutive OFDM symbol time periods including 18 indexed beaconslots, each beaconslot being 912 OFDM symbol time periods wide. Each indexed beaconslot includes three fourth intervals, each fourth interval being two OFDM symbol time periods wide, one fourth period conveying a beacon signal, two fourth periods having intentional tone block null. Each indexed beaconslot also includes 10 first periods, each first period being an OFDM symbol transmission time period wide used to convey a strip symbol, the first periods being grouped two at a time. (See FIG. 8 where m=(0,1) (2,3), (4,5), (6,7), (8,9).) Each indexed beaconslot also include 8 second time periods, each second time period being 112 OFDM symbols wide and being scheduled to convey 112 OFDM symbols including user data.

In the example of FIG. 8, the first tone subset hopping sequence has 97 different predetermined tone subsets to be used to convey the control signals for first time periods. FIG. 10 provides an example of 97 different predetermined tone subsets to be used in the hopping sequence. However the exemplary ultraslot of FIG. 8 includes 180 first time periods. Thus the ultraslot includes one iteration of the first tone set hopping sequence in which each of the 97 indexed tone subsets is used once, corresponding to k=0 to 96 and a portion of a second iteration of the first tone set hopping sequence, corresponding to k=97 to 179. The ordering of the different predetermined tone subsets of the first tone subset hopping sequence is a function of a cell and/or sector identifier. FIG. 7 illustrates the concept two different first tone subset hopping sequences for two different base transmitters, e.g., as a function of cell and/or sector identifier information.

Figure 12:
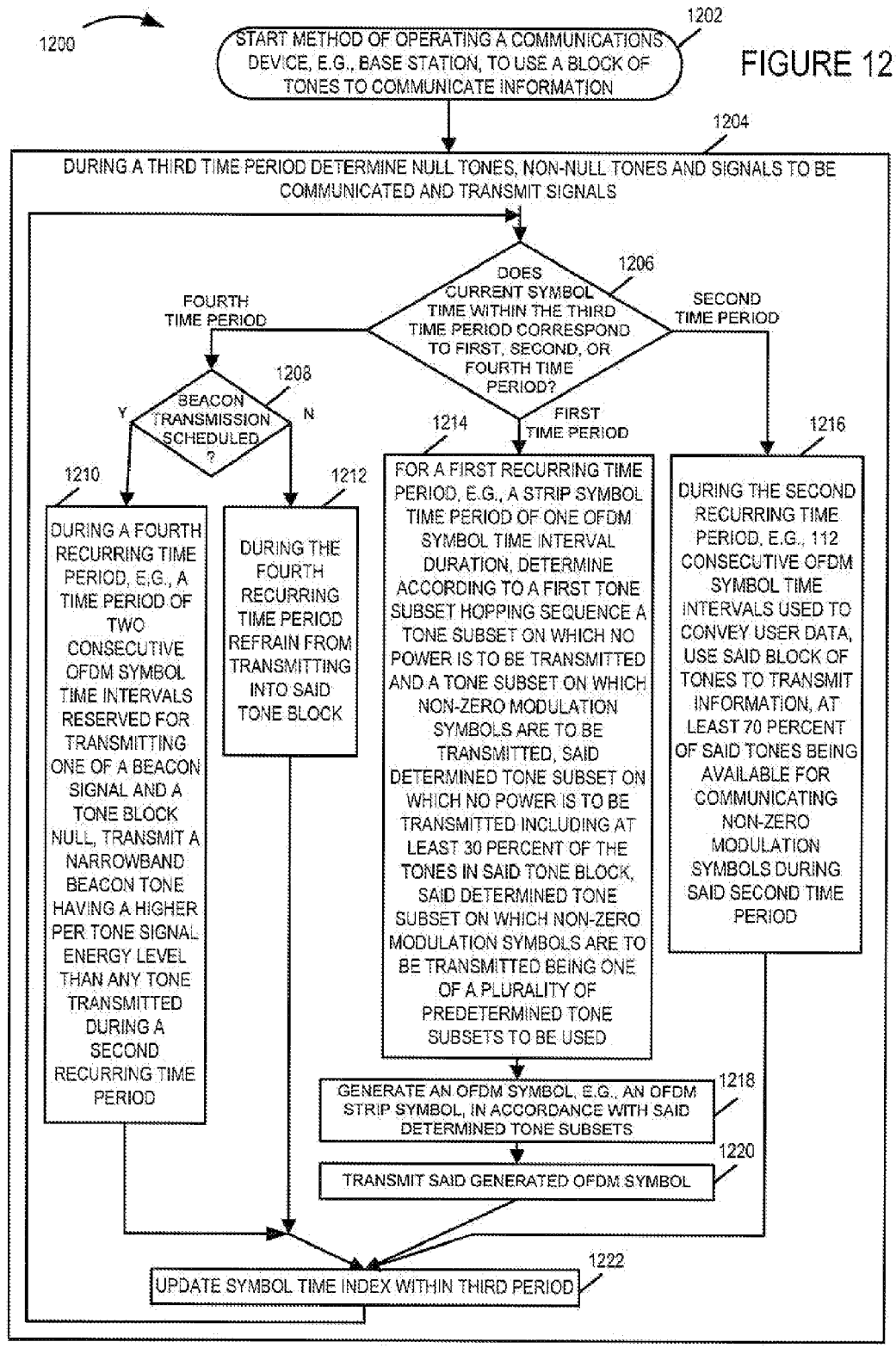
FIG. 12 is a flowchart of an exemplary method of operating a communications device, e.g., a base station, to use a block of tones, to communicate information in accordance with various embodiments.

FIG. 12 is a flowchart 1200 of an exemplary method of operating a communications device, e.g., a base station, to use a block of tones, e.g., a downlink tone block of 113 tones, to communicate information. Operation starts in step 1202, where the communications device is powered on and initialized. Operations proceeds from start step 1202 to step 1204.

In step 1204, the communications device determines null-tones, non-null tones, and signals to be communicated during a third time period and transmits signals, e.g., on a recurring basis. For example, the third time period may be an ultraslot in a recurring timing structure being used by the communications device. Step 1204 includes sub-steps 1206, 1208, 1210, 1212, 1214, 1216, 1218, 1220, and 1222.

In sub-step 1206, the communications devices determines whether the current symbol time within the third time period corresponds to first, second, or fourth time periods. If the current symbol time period corresponds to a fourth time period, operation proceeds from sub-step 1206 to sub-step 1208. If the current symbol time period corresponds to a first time period, operation proceeds from sub-step 1206 to sub-step 1214. If the current symbol time period corresponds to a second time period, operation proceeds from sub-step 1206 to sub-step 1216.

In sub-step 1208, the communications device determines if a beacon transmission is scheduled to be transmitted in the tone block. If a beacon is scheduled corresponding to the current symbol time, operation proceeds from sub-step 1208 to sub-step 1210; if a beacon is not scheduled corresponding to the current symbol time operation proceeds from sub-step 1208 to sub-step 1212. In sub-step 1210, the communications device, during a fourth recurring time period, e.g., a time period of two consecutive OFDM symbol transmission time intervals reserved for one of a beacon signal and a tone block null, transmits a narrowband beacon tone having a higher per tone signal energy level than any tone transmitted during a second recurring time period. In sub-step 1212, the communications device, during the fourth recurring time period refrains from transmitting into said tone block. Operation proceeds from sub-step 1210 or sub-step 1212 to sub-step 1222.

In some embodiments, different base station attachment points in the communications system used different fourth time periods in the third time period to convey beacon signals, e.g., as a function of a cell and/or sector identifier. For example, in one exemplary three sector embodiment, a third time period includes 24 indexed fourth time periods. For example, a sector type 0 attachment point uses fourth time periods with index=0.3, 6, 12, 15, 18, 21 to convey beacon signals and refrains from transmission during fourth time period with index=1, 2, 4, 5, 7, 8, 10, 11, 13, 14, 16, 17, 19, 20, 22, 23 with respect to the tone block; a sector type 1 attachment point uses fourth time periods with index=1, 4, 7, 10, 13, 16, 19, 22 to convey beacon signals and refrains from transmission during fourth time period with index=0, 2, 3, 5, 6, 8, 9, 11, 12, 14, 15, 17, 18, 20, 21, 23 with respect to the tone block; a sector type 2 attachment point uses fourth time periods with index=2, 5, 8, 11, 14, 17, 20, 23 to convey beacon signals and refrains from transmission during fourth time period with index=0, 1, 3, 4, 6, 7, 9, 10, 12, 13, 15, 16, 18, 19, 21, 22 with respect to the tone block.

In sub-step 1214, for a first recurring time period, e.g., a strip symbol time period of one OFDM symbol time interval duration, the communications device determines according to a first tone hopping sequence a tone subset on which no power is to be transmitted and a tone subset on which non-zero modulation symbols are to be transmitted, said determined tone subset on which no power is to be transmitted including at least 30 percent of the tones in said tone block, said determined tone subset on which modulation symbols are to be transmitted being one of a plurality of predetermined tone subsets to be used.

In some embodiments, for a given first time period in the third time period, the union of the subset of determined null tones and the sub-set of non-null tones is the set of tone block tones for the base station attachment point, e.g., the set of downlink tone block tones for the base station attachment point. FIG. 10 includes exemplary tone subset information corresponding to 97 different subsets of null tones and 97 different subsets of non-null tones. By utilizing a mixture of null and non-null tones, the first time periods transmitted signals may be utilized by a receiver, e.g., a wireless terminal receiver, to perform a channel estimation. In addition broadcast control information is communicated by the values of the non-null modulation symbols communicated during the first time period.

Tone subsets corresponding to a given first time period in the third time period are, in some embodiments, determined as a function of cell, sector identifier, and/or tone block corresponding to the attachment point of the communications device, and OFDM symbol time within the timing structure. For example, attachment points corresponding to adjacent cells and or sectors will use different tone hopping sequences using the same subsets of tones. FIG. 9 describes exemplary tone hopping determination.

Operation proceeds from sub-step 1214 to sub-step 1218. In sub-step 1218, the communications device generates an OFDM symbol in accordance with the determined tone subsets from sub-step 1214. Operation proceeds from step 1218 to step 1220. In step 1220, the communications device transmits the generated OFDM symbol from step 1218. Operation proceeds from sub-step 1220 to sub-step 1222.

In sub-step 1216, the communications device, during the second recurring time period, e.g., 112 consecutive OFDM symbol time intervals used to convey user data, the communications device uses said block of tones to transmit information, at least 70 percent of said tones of said tone block being available for communicating non-zero modulation symbols during said second time period. For example, during said second time period downlink traffic channel segment signals are communicated in addition to some control signals. In sub-step 1216, logical channel tones, in some embodiments, are hopped to physical tones in accordance with a tone hopping scheme which is different from the tone subset hopping applicable to first time periods. In some such embodiments, both the tone hopping applicable during second time periods and the tone subset hopping applicable during first time periods utilize cell and/or sector identifier information as inputs to determine hopping, e.g., tone hopping, tone subset hopping. For example different equations are used during first and second time periods with respect to hopping for the same base station sector attachment point. Operation proceeds from sub-step 1216 to sub-step 1222.

In sub-step 1222, the communications device updates the symbol time index within the third time period. For example, in one embodiment, if operations had proceeded to sub-step 1222 via sub-step 1210 or 1222 the index is updated by 2 OFDM symbol transmission time periods; if operations had proceeded to sub-step 1222 via sub-step 1214, the index is updated by one OFDM symbol transmission time period; if operations had proceeded to sub-step 1222 via sub-step 1216, the index is updated by 112 OFDM symbol transmission time periods. In various embodiments, the updating uses modular calculations such that indexing starts for the next successive third time period, e.g., ultraslot, when a third time period completes. Operation proceeds from sub-step 1222 to sub-step 1206.

In various embodiments, the second recurring time period has a duration of at least time 10 times the duration of the first time period. In some embodiments, the second time period has a duration of greater than 50 times the duration of the first time period. In some embodiments, the second time period has a duration of greater than 100 times the duration of the first time period. Since, in some embodiments, second time periods correspond to user data transmission periods, the balance between first and second time periods and the positioning within the timing structure of time periods such as first and fourth time periods in which there is no user data communicated can be an important consideration in achieving uninterrupted user data communications from a user's perspective, particularly in applications needing low latency, e.g., such as a voice application. In some embodiments, exemplary third time periods start with a fourth time period since fourth time periods are utilized to carry beacon signals which are used by wireless terminals in performing synchronization, e.g., frame synchronization.

In various embodiments, for a first time period, the first set tone hopping sequence determines which one of a plurality of predetermined tone subsets to use. For example, the first tone set hopping sequence for a given first time period in a recurring timing structure for a given base station attachment point determines to use the tone subset information corresponding to one of the 97 rows of the table 1000 of FIG. 10. In various embodiments, different adjacent base station attachment points in the wireless communications system use different first time period tone subset hopping sequences.

In various embodiments, the first and second time periods occur within a third time period that repeats on a predetermined basis, OFDM symbol transmission time periods within first time periods being indexed using a modular incremental index, and the first tone set hopping sequence is a function of the modular incremental index. For example, an exemplary ultraslot may include 180 indexed first time periods, but the first tone hopping sequence starts repeating on the 98$^{th}$ first time period in the ultraslot.

In various embodiments, the number of predetermined tone subsets, corresponding to at least one of null tone subsets and non-null tone subsets is a prime number. In the example of FIG. 10, the prime number is 97.

In one exemplary embodiment, the tone subset allocation sequence, sometimes also referred to as the tone subset hopping sequence is given as follows.

Let $f(bssSlopeIndex, bssSectorType, k) = (bssSlopeIndex+1)/((bssSectorType*k+k^2)$ represents the index of the tone subset to be selected in strip-symbol k, where each of the arithmetic operators $(+, ^2, *, /)$ are defined in the field of N, where N is a prime number, for example, N=97;

bssSlopeIndex=the index of the cell slope value, and is preferably the same for each of the sectors of the cell; adjacent cells should have different values for the bssSlopeindex; parameter bssSlopeindex is equal to $0, 1, \ldots, N_1-1$, where $N_1 \leq N$; e.g., in one embodiment, $N_1=96$;

bssSectorType=index of the sector; e.g. assume sector type T is in the set $\{0, 1, \ldots, 5\}$, $\{0,1\}$ or $\{0,1,2\}$; adjacent sectors in a given base station should have different values of T;

f=a function in a sector of a base station;

k=an index of strip-symbol period, where $k=L*10+m$ where m=strip symbol index in a beaconslot, e.g., m is a value in the set $\{0, 1, \ldots, 9\}$.

L=beaconslot index in an ultraslot, e.g., L=a value in the set $\{0, 1, \ldots, 17\}$ Expressed in a slightly different format:

$k=L*10+m;$ $temp0=bssSectorType*k+k*k;$ $temp1=imod(temp0,N);$ $f(bssSlopeIndex,bssSectorType,k)=mod(temp1*(bssSlopeIndex+1),N);$ where for integers x and in, the modulo function mod(x, m) is defined as $mod(x, m)=x-m*floor(x/m)$ where the function floor(x) is defined as the largest integer less than or equal to x; for integers x and m, the inverse modulo function imod(x, m) is equal to y, where $1 \leq y \leq m$, if mod(x*y, m) is equal to 1. If mod(x, m) is zero, then imod(x, m) is set to 0.

In various embodiments the first tone subset hopping sequence is a function of a cell identifier, e.g., a slope value. In various embodiments, the first tone hopping sequence is also a function of a sector identifier value.

Figure 13:
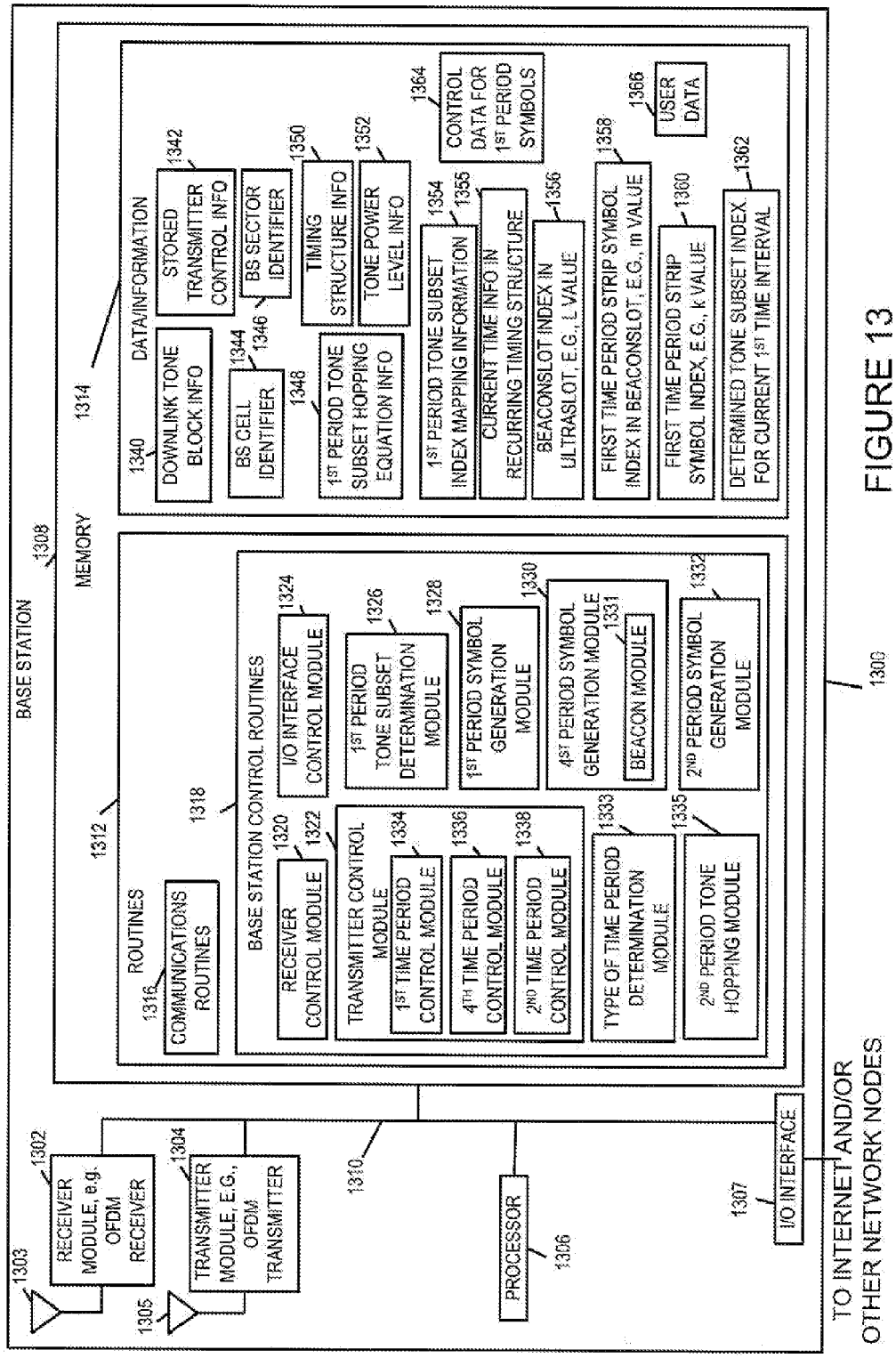
FIG. 13 is a drawing of an exemplary base station implemented in accordance with various embodiments.

FIG. 13 is a drawing of an exemplary base station 1300 implemented in accordance with various embodiments. Exemplary base station 1300 includes a receiver module 1302, a transmitter module 1304, a processor 1306, an I/O interface 1307, and a memory 1308 coupled together via a bus 1310 via which the various elements interchange data and information. Memory 1308 includes routines 1312 and data/information 1314. The processor 1306, e.g., a CPU, executes the routines 1312 and uses the data/information 1314 in memory 1308 to control the operation of the base station 1300 and implement methods.

Receiver module 1302, e.g., an OFDM receiver, is coupled to receive antenna 1303 via which the base station 1300 receives uplink signals from wireless terminals. Transmitter module 1304, e.g., an OFDM transmitter, is coupled to transmit antenna 1305 via which the base station transmits downlink signals to wireless terminals. The downlink signals include strip symbols signals during $1^{st}$ time periods including sets of null tones and sets of non null tones in according with a $1^{st}$ time period tone subset hopping sequence, the non-null tones during the $1^{st}$ time period conveying broadcast control information. The downlink signals also include signals communicated during $2^{nd}$ time periods, e.g., OFDM symbols conveying user data, and signals communicated during $4^{th}$ time periods, e.g., beacon tone signals and intentional tone block null signals. In various embodiments, the base station 1300 includes multiple sectors, e.g., 3 sectors. In some embodiments multiple receiver/transmitter module pairs correspond to each of the sectors.

I/O interface 1307 couples the base station to the Internet and/or other network nodes, e.g., other base stations, routers. AAA nodes, home agent nodes, etc. I/O interface 1307, by coupling the base station 1300 to a backhaul network allows a wireless terminal using a base station 1300 attachment point to participate in a communications session with another wireless terminal using a different base station as its point of network attachment.

Routines 1312 include communications routines 1316 and base station control routines 1318. Communications routines 1316 perform various communications protocols implemented by the base station 1300. The base station control routines 1318 include a receiver control module 1320, a transmitter control module 1322, a type of time period determination module 1333, an I/O interface control module 1324, a $1^{st}$ period tone subset determination module 1326, a $1^{st}$ period symbol generation module 1328, a $4^{th}$ period symbol generation module 1330, a $2^{nd}$ period symbol generation module 1332, and a $2^{nd}$ period tone hopping module.

Receiver control module 1320 controls receiver 1320 operation, e.g., tuning the receiver to the uplink carrier frequency being used by the attachment point, controlling timing adjustments and power level adjustments, and controlling uplink OFDM symbol recovery and decoding operations. I/O interface control module 1324 controls I/O interface 1307 operation, e.g., controlling transmission and recovery of packets communicated via the backhaul.

Transmitter control module 1322 controls operation of transmitter module 1304. Transmitter module control module 1322 includes a $1^{st}$ time period control module 1334, a $4^{th}$ time period control module 1336 and a $2^{nd}$ time period control module 1338. $1^{st}$ time period control module 1334 controls transmitter operation during $1^{st}$ time periods, e.g., predetermined time periods in a recurring downlink structure being used by the base station during which strip symbols are communicated conveying control information. $4^{th}$ time period control module 1336 controls transmitter operation during $4^{th}$ time periods, e.g., predetermined time intervals in the recurring downlink structure being used by the base station during which one of a beacon signal and a tone block null signal is communicated. $2^{nd}$ time period control module 1338 controls transmitter operation during $2^{nd}$ time periods, e.g., predetermined time periods in a recurring downlink timing structure during which user data is communicated. In some embodiments, the recurring downlink timing structure is subdivided into a recurring sequence of indexed third time periods, and each third time period is partitioned into a plurality of first time periods, a plurality of second time periods and a plurality of fourth time periods.

Type of time period determination module 1333 determines whether a time interval, e.g., a current time interval, is one of a $1^{st}$ time period, a $2^{nd}$ time period, or a $4^{th}$ time period in the recurring downlink timing structure being used by the base station. The determination of module 1333 is used in transferring control between various alternatives modules used in signal generation and transmission. For example, if module 1333 determines that the time under consideration corresponds to a $1^{st}$ type time period modules 1326, 1328 and 1334 are utilized, while if module 1333 determines that the time under consideration corresponds to a $4^{th}$ time period modules 1330 and 1336 are utilized.

$1^{st}$ period tone subset determination module 1326 determines for a $1^{st}$ recurring time period, according to a first tone set hopping sequence a tone subset on which no power is to be transmitted, said determined tone subset on which no power is to be transmitted including at least 30% of the tones in the downlink block of tones being used by the base station attachment point; $1^{st}$ period tone subset determination module 1326 also determines for the $1^{st}$ recurring time period, according to the first tone subset hopping sequence a tone subset on which power is to be transmitted. In various embodiments, the downlink tone block for the base station attachment point is partitioned, for a given $1^{st}$ time period in the recurring downlink structure into a tone subset on which no power is to be transmitted and a tone subset on which power is to be transmitted. For example, in an exemplary embodiment using FIG. 10 information, 97 different partitions are shown each associated with an index number, and for any given $1^{st}$ time interval, one of those 97 different partitions are chosen. In some embodiments, $1^{st}$ period tone subset determination module 1326 performs the determination as a function of a cell identifier, a sector type identifier, and a $1^{st}$ time period index in the recurring downlink timing structure. FIG. 9 describes an exemplary tone set allocation module 900 which may be implemented as part of base station 1300, e.g., as module 1326 in base station 1300.

$1^{st}$ period symbol generation module 1328, generates an OFDM symbol to be communicated during a $1^{st}$ time period. The $1^{st}$ period symbol generation module 1328 uses the determined tone subset on which power is to be transmitted from module 1326 to determine which tones are to convey modulation symbols, e.g., modulation symbols carrying control broadcast data, and generates an OFDM symbol to be communicated during the $1^{st}$ time period.

$2^{nd}$ period symbol generation module 1332 generates a sequence of OFDM symbols for a $2^{nd}$ time period, at least some of the OFDM symbols conveying modulations symbols carrying user data, e.g., portions of downlink traffic channel segments. $2^{nd}$ period tone hopping module 1335, which is used by $2^{nd}$ period symbol generation module, performs tone hopping for logical channel tones to physical tones, and uses a different function than $1^{st}$ period tone subset determination module 1326.

$4^{th}$ period symbol generation module 1330 generates, for a given $4^{th}$ time period in the recurring timing structure, one of a two symbol wide beacon signal and a downlink tone block null signal. $4^{th}$ period symbol generation module 1330 includes a beacon module 1331. Beacon module 1331 generates beacon signals, said generated beacon signal to be transmitted during some of said $4^{th}$ time periods in accordance with the recurring timing structure, said generated beacon signal being a narrowband signal including a beacon tone having higher per tone signal energy than any tone transmitted during said second period of time.

Data/information 1314 includes downlink tone block information 1340, stored transmitter control information 1342, base station cell identifier information 1344, base station sector identifier information 1346, $1^{st}$ period tone subset hopping equation information 1348, timing structure information 1350, tone power level information 1352, $1^{st}$ period tone subset index mapping information 1354, current time information in recurring timing structure 1355, beaconslot index in ultraslot 1356, first time period strip symbol index in beaconslot 1358, first time period symbol index 1360, determined tone subset index for current $1^{st}$ time interval 1362, control data for $1^{st}$ period symbol 1364, and user data 1366.

Downlink tone block information 1340 includes a set of downlink tones used by the base station attachment point, e.g., a set of 113 contiguous tones, and a carrier frequency associated with the downlink tone block. Stored transmitter control information 1342 includes information used by module 1332. Base station cell identifier information 1344 includes a locally unique cell identifier associated with base station 1300, e.g., a base station slope value such as an integer value in the range 0, . . . 95, and a base station slope index value, each slope index value associated with a slope value. Base station sector identifier information 1346 includes a base station sector identifier and a base station sector type value, e.g., a base station sector type identifier associated with the sector of transmitter module 1304, e.g., a value in the set {0, 1, 2}.

$1^{st}$ period tone subset hopping equation information 1348 includes information used by $1^{st}$ period tone subset determination module 1326 in generating a tone subset hopping sequence, e.g., information relating base station cell identifier, base station sector type identifier, and $1^{st}$ period index in a recurring timing structure.

Timing structure information 1350 includes OFDM symbol transmission time interval information and information pertaining to grouping of multiple OFDM symbol transmission time intervals in a recurring downlink structure being used by the base station transmitter 1304, e.g. slot information, superslot information, beaconslot information, ultraslot information, etc. Timing structure information 1350 also information identifying $1^{st}$ time periods, information identifying $2^{nd}$ time periods, information identifying $4^{th}$ time periods, information identifying $3^{rd}$ time periods and information including indexing associated with the various types of time periods, e.g., the $1^{st}$ occurrence of a $1^{st}$ type time period in an ultraslot, the second occurrence of a $1^{st}$ type time period in the ultraslot, etc.

Tone power level information 1352 includes power level information associated with various types of downlink signals, e.g., beacon tone signal modulation symbol power level information, non-null tone $1^{st}$ time period modulation symbol power level, traffic channel power level information used for at least some of the modulation symbols conveyed during $2^{nd}$ time periods, pilot channel power level information used for at least some of the modulation symbols conveyed during the $2^{nd}$ time period.

$1^{st}$ period tone subset index mapping information 1354 includes information associating each of a plurality of tone subset indexes with a set of identified null tones and a set of identified non-null tones to be used during a given $1^{st}$ time period if the tone subset index is determined to be the one to be used by determination module 1326. Table 1000 of FIG. 10 is an example of $1^{st}$ period tone subset index mapping information 1354.

Current time info in recurring timing structure 1355 identifies a current position in a recurring downlink timing structure being used by the base station transmitter module 1304. Beaconslot index in ultraslot 1356, e.g., an integer index value L in the range 0 . . . 17, identifies which beaconslot in an ultraslot the current time corresponds to. $1^{st}$ time period strip symbol index in beaconslot 1358, e.g., an integer value m in the range 0, . . . 9, identifies which indexed strip symbol the current time corresponds to in a beaconslot, when the time corresponds to a time period. $1^{st}$ time period strip symbol index 1360, e.g., a integer value k, identifies an index value used for strip symbols during $1^{st}$ time periods of an ultraslot, e.g. k is an integer value in the range 0 . . . 179. In some embodiments k is generated as a function of values L and in by $1^{st}$ tone subset determination module 1326. Determined tone subset index for current $1^{st}$ time interval 1362 is a result of determination module 1326 which is a function of base station cell identifier 1344, base station sector identifier 1346 and first time period strip symbol index 1360.

Control data for $1^{st}$ period symbols 1364 includes control data/information to be conveyed on modulation symbols to be broadcast during $1^{st}$ time periods on the non-null tones. User data 1366 includes data/information, e.g., voice, video, audio, text, image, file, etc. data/information to be conveyed via modulation symbols of traffic channel segments during $2^{nd}$ time periods.

In various embodiments, during $2^{nd}$ recurring time periods, a block of downlink tones, e.g., a downlink tone block of 113 tones, is used to transmit information, at least 70% of the said downlink tone block tones being available for communicating non-zero modulation symbols during a $2^{nd}$ time period. In some embodiments, a second time period has a duration at least 10 times the duration of a $1^{st}$ time period. In one exemplary embodiment, a $1^{st}$ time period has a duration of 1 OFDM symbol transmission time interval and a $2^{nd}$ time period has a duration of 112 OFDM symbol transmission time intervals. In some embodiments, the timing structure is such that multiple, e.g., two or three $1^{st}$ time periods are grouped together. In some embodiments, the timing structure is such that a predetermined grouping of $1^{st}$ time period has the same duration as a fourth time period, e.g., a fourth time period during which a beacon signal can be communicated.

In various embodiments, the first period tone subset determination module 1326 determines, for a given $1^{st}$ time period in the recurring downlink timing structure being used by the base station transmitter module 1304, which one of a plurality of predetermined tone subsets to use, e.g., which tone subset index from the table 1000 of FIG. 10 to use. In some embodiments the number of predetermined tone subset index values is a prime number, e.g., 97.

In various embodiments, the first and second time periods occur within a third time period which repeats on a predetermined basis. For example, the third time period may be an exemplary ultraslot, while each first time period may be a strip symbol time period and the second time period may be a set of consecutive OFDM symbol transmission time periods used for conveying user data.

In some embodiments, the $1^{st}$ period tone subset determination module 1326 uses $1^{st}$ period tone subset hopping equation information 1348 to implement the equation: f (bssSlopeIndex, bssSectorType, k)=(bssSlopeIndex+1)/((bssSectorType*k+$k^2$), wherein: f (bssSlopeIndex, bssSectorType, k) represents the index of the tone subset to be selected in strip-symbol k for the base station sector having a bssSlopeIndex value and a bssSectorType value; each of the arithmetic operators (+, $^2$, *, /) are defined in the field of N, where N is a prime number; bssSlopeIndex=a locally unique cell identifier value in the set of values to {0, 1, . . . , $N_1$–1}, where and $N_1 \leq N$ and $N_1$ is a non-zero positive integer; bssSectorType=a sector identifier value index of the sector from one of the sets {0, 1 . . . , 5}, {0, 1} and {0,1,2}; f=a function in a sector of a base station; and k is a non-negative integer. In some such embodiments N=97, $N_1$=96. In some embodiments, k=L*n+m where m=strip symbol index in a first type time slot and m is a non-negative integer; L=first type time slot index in a second type time slot; and n=the number of indexed strip symbols in a first type time slot. In some embodiments said first type time slot is a beaconslot, said second type time slot is an ultraslot, wherein m=a value in the set {0, 1, . . . , 9}; wherein L=a value in the set {0, 1, . . . , 17}; and n=10.

In some embodiments, fourth and first time periods belong to time reserved for a broadcast channel, fourth time periods correspond to time intervals reserved for a beacon sub-channel, while first time periods correspond to time reserved for a non-beacon broadcast sub-channel. In some embodiments, transmission symbol time intervals during both $1^{st}$ and $4^{th}$ time periods are referred to as strip symbol time intervals, and the strip symbol time intervals are further classified as beacon strip symbol time intervals and non-beacon strip symbol time intervals.

Figure 18:
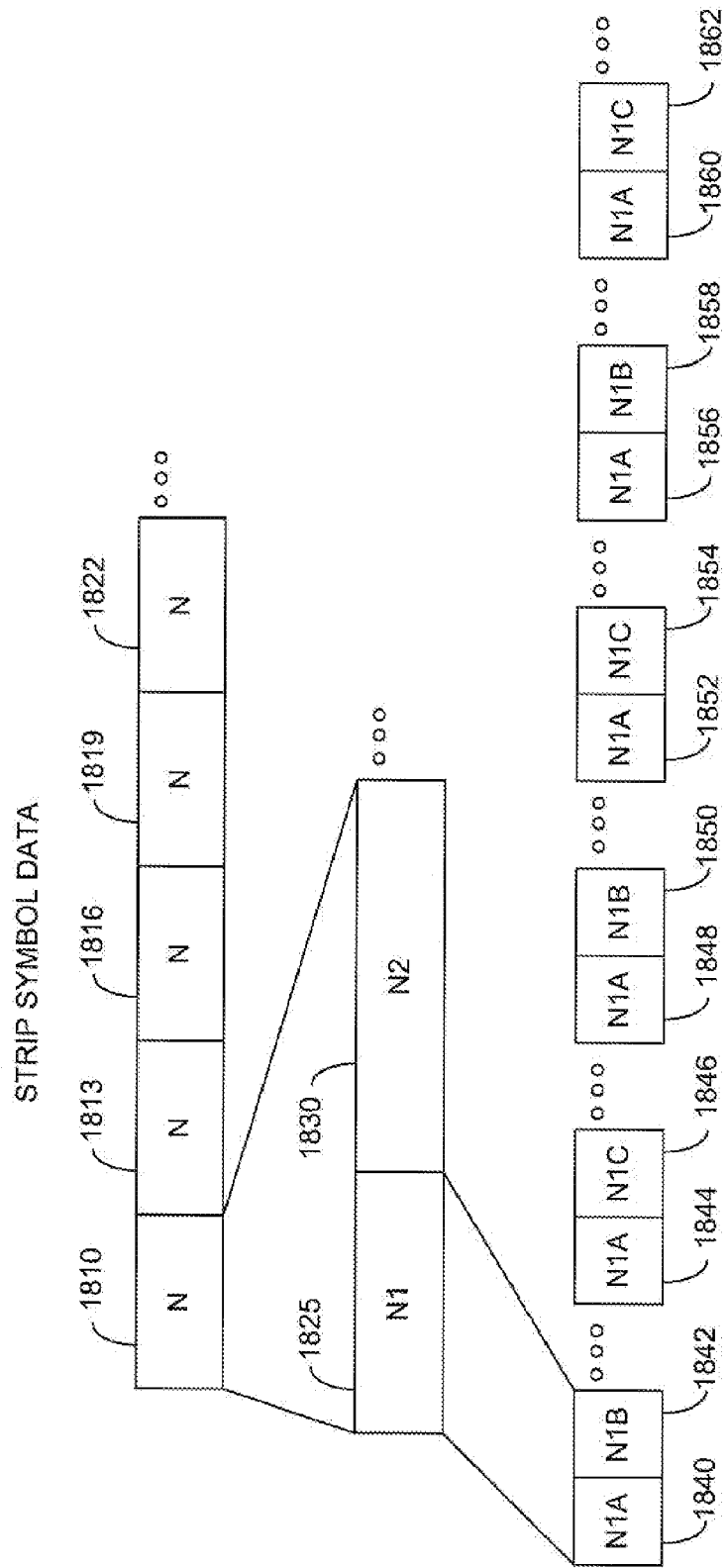
FIG. 18 is a diagram illustrating overhead signal data.

FIG. 18 is a diagram illustrating overhead signal data, e.g., strip symbol data. Strip symbol data may be divided into code blocks. Type of period determination module 1333, shown with respect to FIG. 13, or type of period determination module 1530, shown with respect to FIG. 15, determines whether a time period or symbol is a beacon symbol ($4^{th}$ time periods), a strip symbol ($1^{st}$ time periods) or user data (second time periods). Transmitter control module 1322, shown with respect to FIG. 13, controls the transmitter to transmit strip symbols during $2^{nd}$ time periods, also known as overhead data time periods. Or, in the case of the wireless terminal, $1^{st}$ time period processing module 1534, shown with respect to FIG. 15, communicates information to processor 1506, as a result of the method and devices described herein. Strip symbols may be as shown in FIG. 8, having a periodic relationship to a timing reference such as a beacon. Referring again to FIG. 18, several OFDM strip symbols may be included in one code block. Several strip symbol code blocks 1810, 1813, 1816, 1819 and 1822 are shown, each comprising N bits, which may for example include 6 strip symbols.

Each strip symbol code block may be divided into fixed bit-use data 1825 and flexible bit use data 1830. Fixed bit-use data 1825 is shown having N1 bits. Flexible bit-use data 1830 is shown having N2 bits. In the example, N1+N2=N. Fixed bit-use data 1825 means that the bits have a predetermined use. That is, the use of the bits is determined by the position of the bits in the code block, but not necessarily explicitly defined in some message header. For example, certain can be bits are predetermined to be used to identify a software version of a base station. As another example, other bits can be used to state the system time. Still other bits can be used to state an access priority. For example, if a base station is heavily loaded, it may be that only high priority users can access the base station, or that the services allowed vary based on loading, for example. The fixed bit-use bits may also be used to state a carrier or sector configuration. For example, the bits can be used to state what carriers or how many carriers are being used, or how many sectors are being used. Fixed bit-use bits can also be used to state the transmit power used by the transmitter, e.g., in the unit of dBm.

Flexible bit-use data 1830 can be used to give, certain flexible overhead data. Typically, flexible bit-use data 1830 will have at least three fields: a type field, a length field and a data field. The type field states what type of data is included in the flexible bit-use data 1830. The length field states how long the data is. The data field contains the data being transmitted. For example, flexible bit-use data may be other carrier or other sector loading information. For example, a base station may broadcast to the wireless terminals the loading conditions at another sector of the base station. This can, for example, assist wireless terminals in deciding whether to hand-off to the other sector. In the example, the type field would identify flexible bit-use data 1830 as other sector loading information. The length field of flexible bit-use data 1830 would state how long the data (other sector loading information) is. Then the data field would include the data regarding the loading of the other sector. A possibility with flexible bit-use data 1830 is that data can run longer than N2 bits. That is, one report, such as, other sector report data can run from block 1810 to 1813. In that case, the wireless terminals know to combine data from flexible bit-use data 1830 from strip symbol block 1810 and from strip symbol block 1813.

The data in fixed bit-use data 1825 is periodic, with some period relative to a fixed time reference, such as, for example, a beacon. The periodicity for different types of data may be different. For example, loading information in the sector may be broadcast in every strip symbol block, while other data, such as, for example, software version information may be broadcast only once every other strip symbol block. Data blocks 1844 and 1846 are the fixed bit-use data corresponding to strip symbol block 1813. Data blocks 1848 and 1850 are the fixed bit-use data corresponding to strip symbol block 1816, etc. Blocks 1840, 1844, 1848, 1852, 1856, and 1860 are all labeled with N1A to indicate that they are all the same type of data, e.g., sector loading information. But blocks 1842 and 1846 are different types of data. For example, block 1842, labeled N1B, may be system software information, which is not repeated again until the next block labeled N1B, namely block 1850. Thus, software version information has a period twice the period of the sector loading information. Block 1846, labeled N1C, may be access priority information, which, in the example, is repeated next in block 1854. Exemplary periods include some values around 10 milliseconds, 100 milliseconds, 1 second, and 1 minute.

Figure 19:
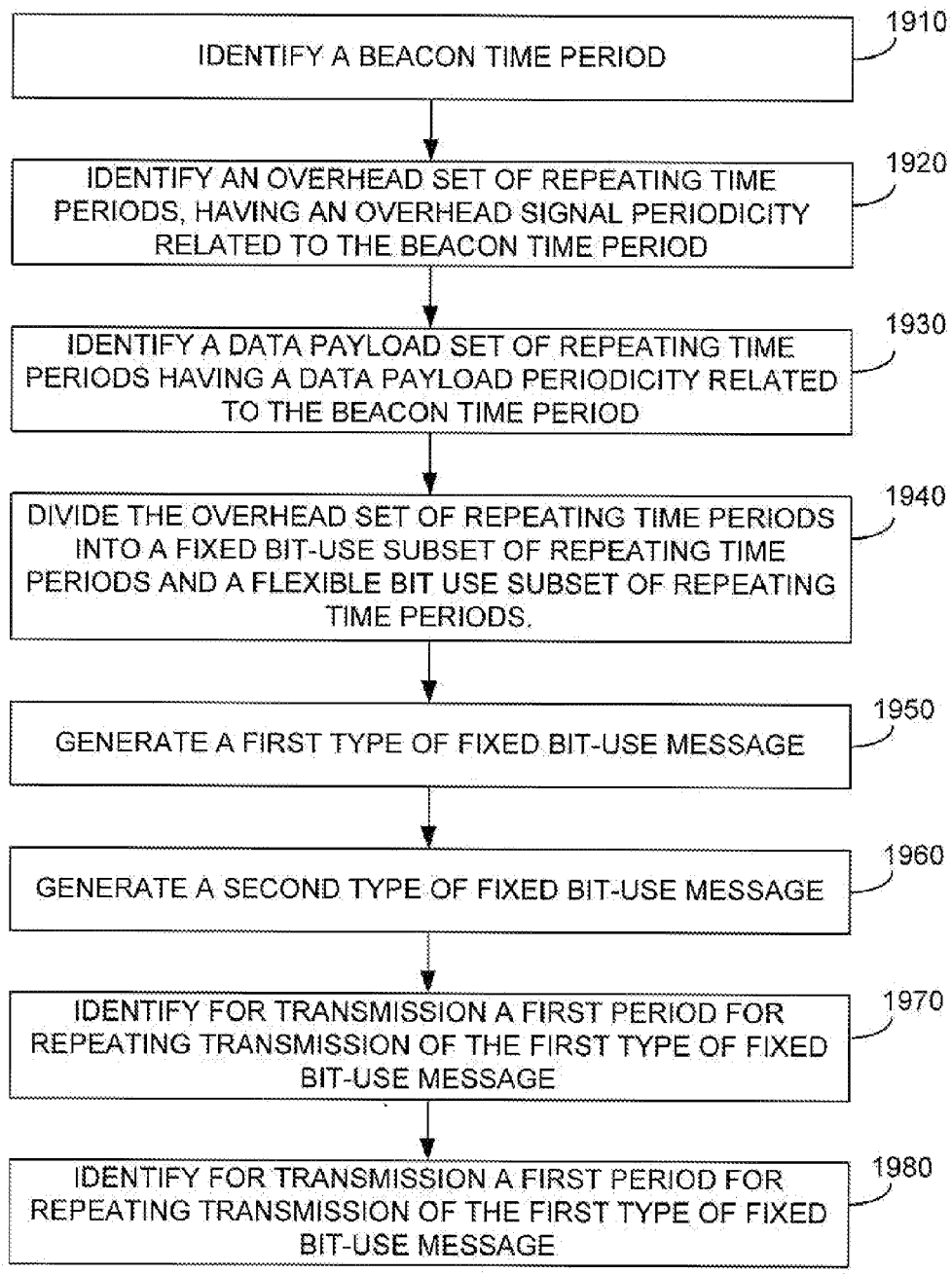
FIG. 19 is a flow chart illustrating a method of using strip symbol data to communicate information.

FIG. 19 is a flow chart illustrating a method of strip symbol data to communicate information. In step 1920, a beacon time period is identified. The beacon time period is a reference time, for example the start of a beacon slot. In step 1920, an overhead set of repeating time periods is identified, having an overhead signal periodicity related, to the beacon time period. For example, the overhead set of repeating time periods may be non-beacon strip symbol periods. In step 1930, a data payload set of repeating time periods is identified having a data payload periodicity related to the beacon time period. The data payload set of repeating time periods may be the user data time periods, also known as the $2^{nd}$ time periods. In step 1940, the overhead set of repeating time periods is divided into a fixed bit-use subset of repeating time periods and a flexible bit use subset of repeating time periods, for example, as shown with respect to FIG. 18.

Steps 1950 to 1980 are optional. In step 1950, a first type of fixed bit-use message is generated. In step 1960, a second type of fixed bit-use message is generated. In step 1960, a first period for repeating transmission of the first type of fixed bit-use message is identified for transmission. For example, the first type of fixed bit-use message may be messages 1840, 1844, 1848, 1852, 1856, 1860, etc. In step 1970, a second period for repeating transmission of the second type of fixed bit-use message is identified for transmission. Second type of fixed bit-use message may be messages 1842, 1850 and 1858, etc. The first type of fixed bit-use message may be one of a software version, a system time, an access priority, loading information, carrier configuration, sector configuration, and transmission power. A flexible bit-use message for the flexible bit-use subset of repeating time periods may include an other carrier loading message. A flexible bit-use message for the flexible bit-use subset of repeating time periods may be an other sector loading message.

Figure 14A:
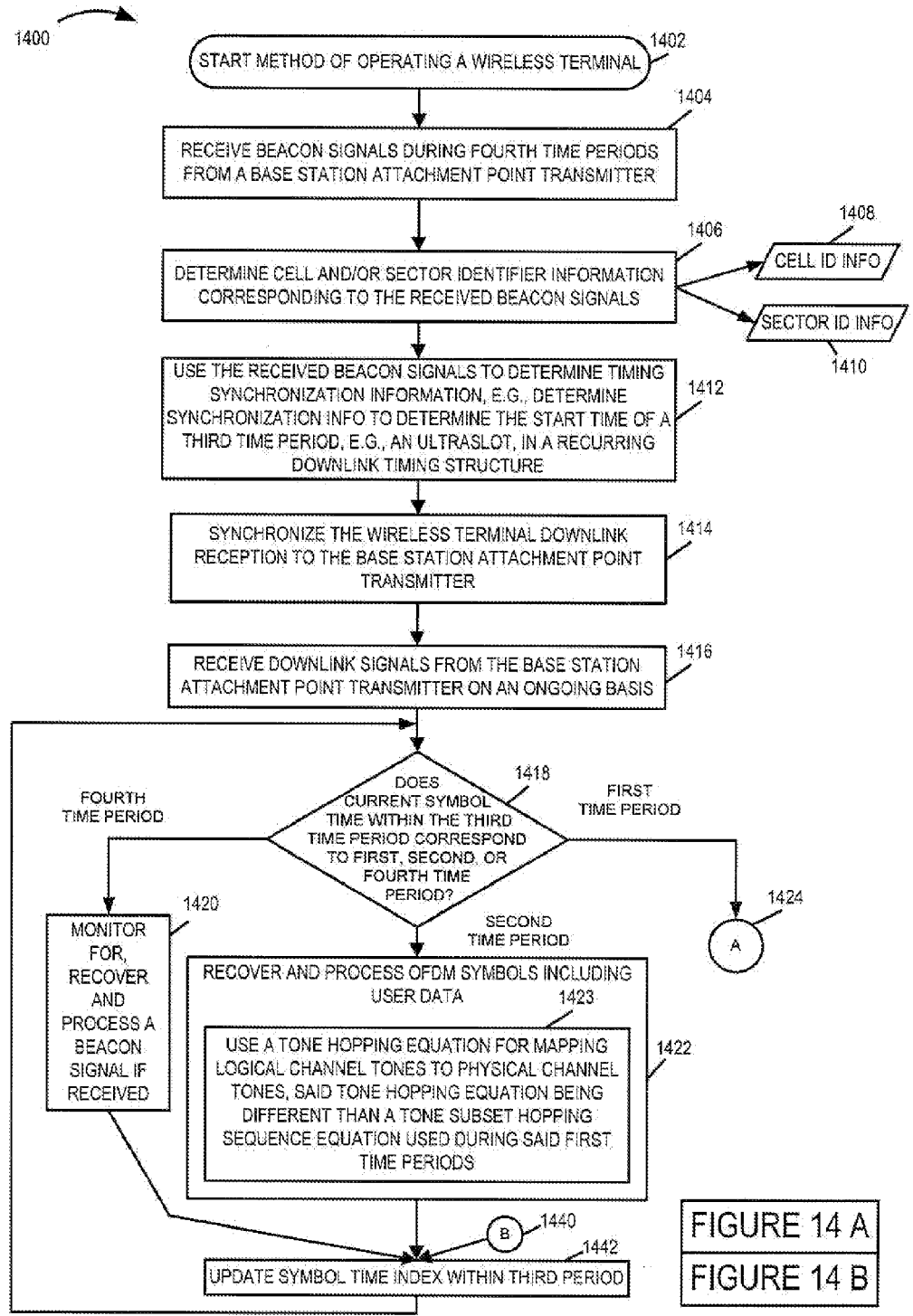
FIG. 14 comprising the combination of FIG. 14A
FIG. 14B is a flowchart of an exemplary method of operating a wireless terminal in accordance with various embodiments.
Figure 14B:
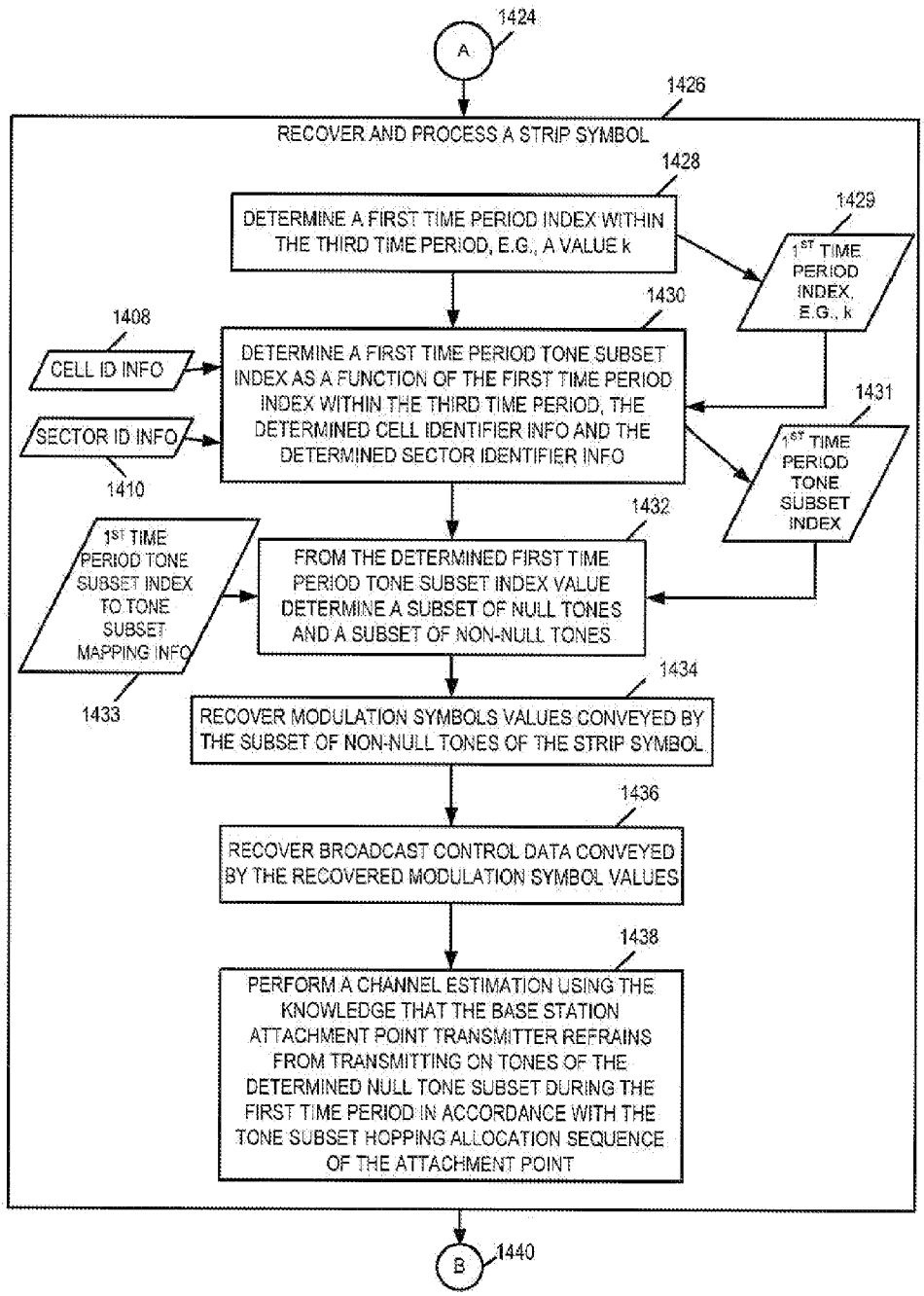

FIG. 14 comprising the combination of FIG. 14A and FIG. 14B is a flowchart of an exemplary method of operating a wireless terminal in accordance with various embodiments. Operation starts in step 1402, where the wireless terminal is powered on and initialized. Operation proceeds from start step 1402 to step 1404.

In step 1404, the wireless terminal receives beacon signals during fourth time periods from a base station attachment point transmitter. Operation proceeds from step 1404 to step 1406. In step 1406 the wireless terminal determines cell and/or sector identifier information (1408, 1410) corresponding to the received beacon signals from the base station attachment point transmitter. Operation proceeds from step 1406 to step 1412. In step 1412, the wireless terminal uses the received beacon signals to determine timing synchronization information. For example, the wireless terminal determines synchronization information to determine the start time of a third time period, e.g., an ultraslot, in a recurring downlink timing structure. Then, in step 1414, the wireless terminal uses the determined synchronization information from step 1414 to synchronize the wireless terminal's downlink reception to the base station attachment point transmitter. Operation proceeds from step 1414 to step 1416.

In step 1416, the wireless terminal receives downlink signals from the base station attachment point transmitter on an ongoing basis. Operation proceeds from step 1416 to step 1418. In step 1418, the wireless terminal determines whether the current symbol time within the third time period corresponds to a first, second, or fourth time period. If the current symbol time within the third time period corresponds to a fourth time period, operation proceeds from step 1418 to step 1420; if the current symbol time within the third time period corresponds to a second time period, operation proceeds from step 1418 to step 1422; if the current symbol time within the third time period corresponds to a first time period, operation proceeds from step 1418 via connecting node A 1424 to step 1426.

In step 1420, the wireless terminal monitors for, recovers and processes a beacon signal if received. In some embodiments, some fourth time periods convey beacon signals while some fourth time periods corresponds to intentional downlink tone block nulls by the base station attachment point transmitter. Operation proceeds from step 1420 to step 1442.

In step 1422, the wireless terminal recovers and processes OFDM symbols including user data. Step 1422 includes sub-step 1423. In sub-step 1423, the wireless terminal uses a tone hopping equation for mapping logical channel tones to physical channel tones, said tone hopping equation being different than a tone subset hopping sequence equation used during said first time periods. In various embodiments, the hopping function of sub-step 1423 uses as input at least one of cell ID information 1408 and sector ID information 1410. Operation proceeds from step 1422 to step 1442.

In step 1426, the wireless terminal recovers and processes a strip symbol. Step 1426 includes sub-steps 1428, 1430, 1432, 1434, 1436 and 1438. In sub-step 1428, the wireless terminal determines a first time period index within the third time period, e.g., a value k 1429. Operation proceeds from sub-step 1428 to sub-step 1430.

In sub-step 1430, the wireless terminal determines a first time period tone subset index 1431 as a function of the first time period index within the third time period 1429, the determined cell identifier information 1408 and the determined sector identifier information 1410. For example, in sub-step 1430, the same tone subset hopping function previously described with respect to flowchart 1200 and base station 1300 for $1^{st}$ time periods may be used. Operation proceeds from sub-step 1430 to sub-step 1432. In sub-step 1432, the wireless terminal uses the determined $1^{st}$ time period tone subset index value 1431 and stored $1^{st}$ time period tone subset index to tone subset mapping information 1433 to determine a subset of null tones and a subset of non-null tones. In one exemplary embodiment mapping information 1433 may include information of table 1000 of FIG. 10. Operation proceeds from sub-step 1432 to sub-step 1434.

In sub-step 1434, the wireless terminal recovers modulation symbol values conveyed by the identified subset of non-null tones of the strip symbol. Operation proceeds from sub-step 1434 to sub-step 1436. In sub-step 1436, the wireless terminal recovers broadcast control data conveyed by the recovered modulation symbol values. Operation proceeds from sub-step 1436 to sub-step 1438. In sub-step 1438, the wireless terminal performs a channel estimation using the knowledge that the base station attachment point transmitter refrains from transmitting on the tones of the determined null tone subset during the first time period in accordance with the tone subset hopping allocation sequence of the attachment point. In various embodiments, the operation of sub-steps 1434, 1436 and 1438 are performed in a different order and/or one or more of sub-step 1434, 1436, 1438 are performed jointly. For example, channel estimation may precede broadcast control data recovery. Operation proceeds from step 1426 via connecting node B 1440 to step 1442.

In step 1442, the wireless terminal updates the symbol time index within the third time period. Depending upon the path to step 1442, the amount of indexing update is, in some embodiments, different. For example, in one exemplary embodiment, a fourth time period occupies two consecutive OFDM symbol transmission time periods, a second time period occupies 112 consecutive OFDM symbol transmission time periods, and a first time period occupies a single OFDM symbol transmission time period. The updating of step 1442 also takes into account that the third period indexing restarts when a third time period is completed, e.g., using modular operations. In some embodiments, the first time period tone subset index value, k, is reset, e.g., to 0, at the start of a new third time period, e.g., new ultraslot.

Operation proceeds from step 1442 to step 1418, where the wireless terminal determines whether the current symbol time index within the third time period corresponds to a first, second or fourth time period.

Figure 15:
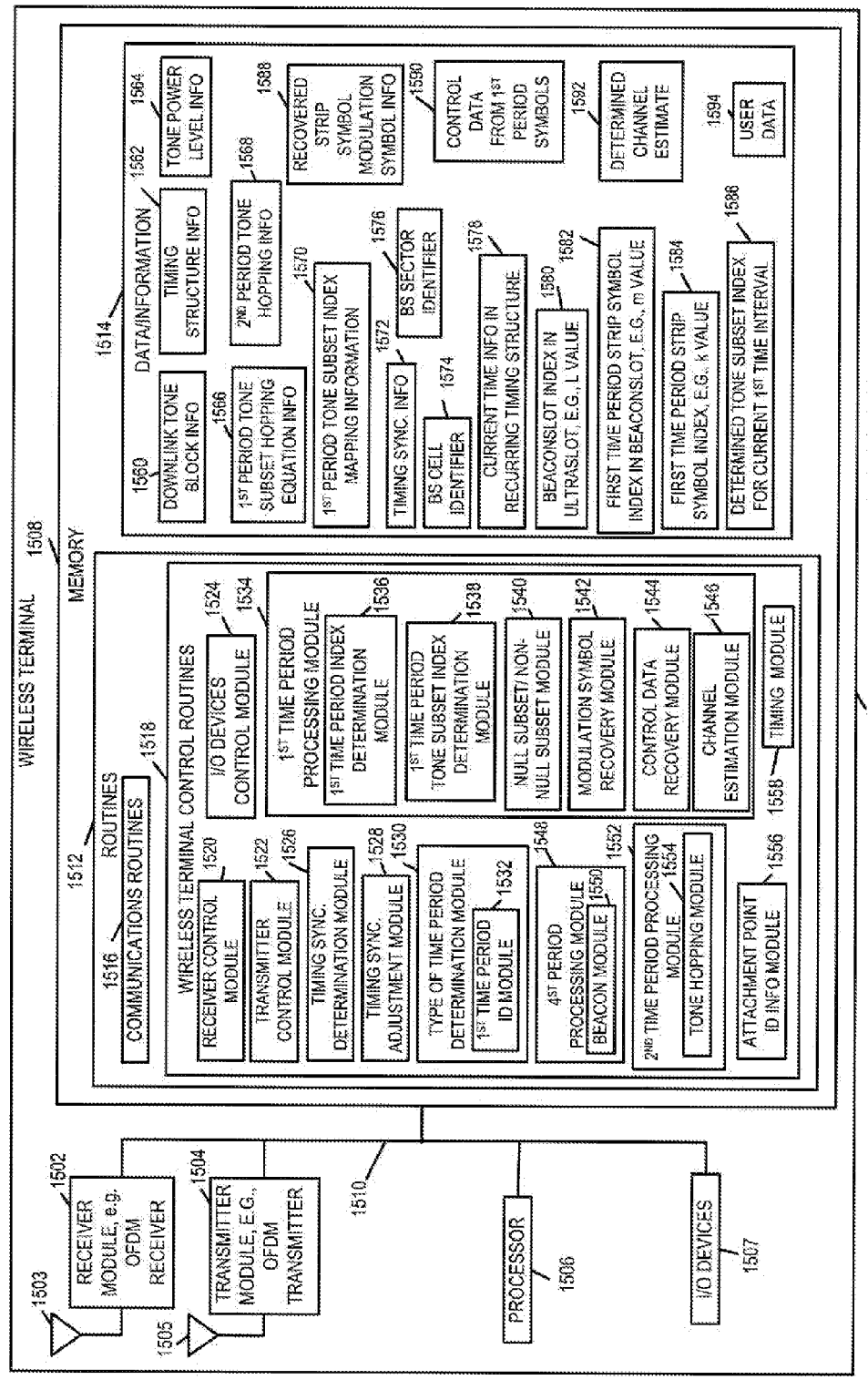
FIG. 15 is a drawing of an exemplary wireless terminal implemented in accordance with various embodiments.

FIG. 15 is a drawing of an exemplary wireless terminal 1500 implemented in accordance with various embodiments. Exemplary wireless terminal 1500 may implement the method of the flowchart 1400 of FIG. 14. Exemplary wireless terminal 1500 includes a receiver module 1502, a transmitter module 1504, a processor 1506, I/O device 1507, and memory 1508 coupled together via a bus 1510 over which the various elements may interchange data and information. Memory 1508 includes routines 1512 and data/information 1514. The processor 1506, e.g., a CPU, executes the routines 1512 and uses the data/information 1514 in memory 1508 to control the operation of the wireless terminal and implement methods.

Receiver module 1502, e.g., an OFDM receiver, is coupled to receive antenna 1503 via which the wireless terminal 1500 receives downlink signals from base station attachment point transmitters, said downlink signals including beacon signals, strip symbol signals, and user data signals. Transmitter module 1504, e.g., an OFDM transmitter, is coupled to transmit antenna 1505 via which the wireless terminal 1500 transmits uplink signals to base station sector attachment points. In some embodiments, the same antenna is used for the receiver module 1502 and transmitter module 1504, e.g., in conjunction with a duplex module.

I/O devices 1507 include, e.g., microphone, keyboard, keypad, mouse, switches, camera, speaker, display, etc. I/O devices 1507 allow a user of wireless terminal 1500 to input data/information, access output data/information, control applications, and initiate and/or control at least some functions, e.g., initiate a communications session.

Routines 1512 include communications routines 1516 and wireless terminal control routines 1518. The communications routines implement various communications protocols used by the wireless terminal. The wireless terminal control routines 1518 include a receiver control module 1520, a transmitter control module 1522, an I/O devices control module 1524, a timing synchronization determination module 1526, a timing synchronization adjustment module 1528, a type of time period determination module 1530, a $1^{st}$ time period processing module 1534, a $4^{th}$ time period processing module 1548, a $2^{nd}$ time period processing module 1552, an attachment point identification module 1556, and a amine module 1558.

Receiver control module 1520 controls various functions of receiver module 1502, e.g., controlling a search carrier search routine and tuning the receiver to a downlink carrier frequency. Transmitter control module 1522 controls operations of transmitter module 1504, e.g., module 1522 controls uplink carrier setting, uplink frequency and timing adjustments, uplink OFDM symbol construction and transmission, and transmitter power levels. I/O devices control module 1524 controls operation of I/O devices 1507.

Timing synchronization determination module 1526 determines timing synchronization information with respect to a recurring third time period, e.g., an ultraslot, of a base station attachment point transmitter. For example, the timing synchronization determination module 15256 uses one or more received beacon signals to determined timing synchronization information. Timing synchronization adjustment module 1528 synchronizes downlink reception using the determined timing synchronization information from module 1526. For example, the timing synchronization adjustment module 1528 synchronizes downlink reception such that strip symbol signals can be recovered, the strip symbol signals being received from the same base station attachment point, corresponding to the received beacon signals from which the synchronization information was derived.

Type of time period determination module 1530 identifies various different types of time periods in a recurring downlink timing structure being used by a base station attachment point, e.g., a $1^{st}$ type of time period during which a strip symbol conveying broadcast control data is communicated, a $4^{th}$ type of time period during which one of a beacon signal and a downlink tone block null is communicated, and a $2^{nd}$ type time period during which a plurality of OFDM symbols including user data are communicated. Type of time period determination module 1530 includes a $1^{st}$ time period identification module 1532 which identifies $1^{st}$ time periods in a larger recurring third time period, e.g., module 1532 identifies strip symbol time periods in an ultraslot.

$1^{st}$ time period processing module 1534 recovers and processes received strip symbols communicated during first time periods. A base station sector attachment point transmitting a strip symbol uses a corresponding tone subset hopping sequence during a first time period, a strip symbol time period, but does not use the tone subset hopping sequence during other time periods within the third time period, e.g., beacon signaling time periods and user data signaling time periods. Different base station sector attachment point transmitters in a local area the wireless communications system use different tone subset hopping sequences. $1^{st}$ time period processing module 1534 includes a $1^{st}$ time period index determination module 1536, a $1^{st}$ time period tone subset index determination module 1538, a null subset/non-null subset determination module 1540, a modulation symbol recovery module 1542, a control data recovery module 1544, and a channel estimation module 1546.

$1^{st}$ time period determination module 1536 determines the index of the first time period being processed with the third time period. For example, in some embodiments, each third time period, e.g., ultraslot, includes 180 indexed first time periods, strip symbol time periods, with k being the index value in the range 0 . . . 179.

$1^{st}$ time period tone subset index determination module 1538 determines a first time period tone subset index as a function of the identified first time period in the third time period, e.g., the index value from module 1536, cell identifier information and sector identifier information. For example, the cell and sector identifier information, which correspond to base station attachment point which transmitted the received strip symbol being processed, are in some embodiments, recovered from information communicated via the beacons signal from the same base station attachment point. $1^{st}$ time period tone subset index determination module 1538, in some embodiments, uses a tone subset hopping function as previously described, e.g., with respect to FIG. 12, 13, or 14. In one exemplary embodiment, $1^{st}$ time period tone subset index determination module 1538 determines one of the 97 indexes of table 1000 of FIG. 10.

Null subset/non-null subset module 1540 determines a subset of null tones and a subset of non-null tones using the $1^{st}$ time period tone subset index determined by module 1538 and stored $1^{st}$ time period tone subset index to tone subset mapping information. Modulation symbol recovery module 1542 recovers modulation symbol values conveyed, by the non-null tones of the strip symbol. Control data recovery module 1544 recovers broadcast control data conveyed by the recovered modulation symbol values from module 1542. Channel estimation module 1546 performs a channel estimate using the knowledge that the base station attachment point transmitter has refrained from transmitting on tones of the determined null tone subset during the first time period in accordance with the tone subset hopping allocation sequence of the attachment point.

Fourth time period processing module 1548 processes signals received during fourth time periods, e.g., beacon signals and intentional downlink tone block nulls. Fourth time period processing module 1548 includes a beacon module 1550 which processes received beacon signals, e.g., identifying beacon tones, identifying sequences of beacon tones, and/or determining cell and/or sector identifier information corresponding to the received beacon signals. Attachment point identification information module 1556 obtains and/or determines identification information corresponding to an attachment point of interest, e.g., an attachment point to which the wireless terminal seeks to connect or is currently connected. In some embodiments, a wireless terminal may receive cell and/or sector identifier information communicated via beacon signals, e.g., a slope value and a sector index value. The attachment point information module 1556, in some embodiments, further processes such information, e.g., obtaining a slope index value and a sector type value which are used by the $1^{st}$ time period tone subset index determination module 1538.

$2^{nd}$ time period processing module 1552 receives and processes OFDM symbols including user data during a second time period, said second time period being in said third time period, said second time period having a duration of at least time times the duration of a first time period. $2^{nd}$ time period processing module 1552 includes tone hopping module 1554. Tone hopping module 1552 uses a logical channel tone to physical tone hopping function and cell and/or sector identifier information to determine the tone hopping. The tone hopping function used by module 1554 during $2^{nd}$ time periods uses a different equation than the tone subset hopping function used during $1^{st}$ time periods.

Timing module 1558 maintains and updates symbol timing for the wireless terminal 1500, e.g., updating symbol time index within the third time period. In one exemplary embodiment, a first time period has a duration of 1 OFDM symbol transmission time period, a $4^{th}$ time period has a duration of two OFDM symbol transmission time periods, and a $2^{nd}$ time period has a duration of 112 OFDM symbol transmission time periods.

Data/information 1514 includes downlink tone clock information 1560, timing structure information 1562, tone power level information 1564, $1^{st}$ period tone subset hopping equation information 1566, $2^{nd}$ period tone hopping information 1568, $1^{st}$ period tone subset index mapping information 1570, timing synchronization information 1572, base station cell identifier information 1574, base station sector identifier information 1576, current time information in recurring timing structure 1578, beaconslot index in ultraslot, e.g., L value 1580, first time period strip symbol index in beaconslot, e.g., in value 1582, first time period strip symbol index, e.g., k value 1584, determined tone subset index for current $1^{st}$ time interval 1586, recovered strip symbol modulation symbol information 1588, control data from $1^{st}$ period symbols 1590, determined channel estimate 1592, and user data 1594. Downlink tone block information 1560 includes information corresponding to one or more downlink tone blocks, a downlink tone block of 113 OFDM tones, used in the communications system including carrier frequency, number of tones in the tone block, frequencies of the tones, etc. Timing structure information 1562 includes information of a recurring downlink timing structure including OFDM symbol transmission time period information and information relating, to grouping of OFDM symbol transmission time periods, e.g., third time periods such as ultraslots, first time periods such as strip symbol time periods, second time periods such as user data signaling time periods, and fourth time periods such as periods reserved for one of a beacon signal and an intentional downlink tone block null. Tone power level information 1564 includes base station attachment point transmission power level information associated with the various types of signals, e.g. beacon information, strip symbol broadcast control signals, pilot channel, traffic channel user data signals, etc.

$1^{st}$ tone period tone subset hopping equation information 1566 includes information used by $1^{st}$ time period tone subset index determination module 1538, e.g., in implementing the hopping equation for $1^{st}$ time periods. $2^{nd}$ period tone hopping information 1568 is used by tone hopping module 1554 in performing downlink tone hopping during $2^{nd}$ time periods. $1^{st}$ period tone subset index mapping information 1570 includes, e.g., the information of table 1000 of FIG. 10.

Timing synchronization information 1572 includes information determined from module 1526 and used by module 1528, e.g., offset information allowing the wireless terminal to synchronize with respect to the start of an ultraslot in the downlink timing structure. Base station cell identifier information 1574 includes information such as a slope value and/or slope index value associated with a base station attachment point for which a strip symbol is being processed. In some embodiments cell identifier information is obtained and/or derived from modules 1550 and/or module 1556. Base station sector identifier information 1576 includes information such as a sector value and/or sector type value associated with a base station attachment point for which a strip symbol is being processed. In some embodiments sector identifier information 1576 is obtained and/or derived from modules 1550 and/or module 1556. Base station cell identifier information 1574 and base station sector identifier information 1576 is used by $1^{st}$ time period tone subset index determination module 1538, and tone hopping module 1554, e.g., as control inputs.

Current time info in recurring timing structure 1578 identifies a current position in a recurring downlink timing structure being used by a base station attachment point transmitter of which the wireless terminal has synchronized its downlink timing structure to recover downlink signals. Beaconslot index in ultraslot 1580, e.g., an integer index value L in the range 0 . . . 17, identifies which beaconslot in an ultraslot the current time corresponds to. $1^{st}$ time period strip symbol index in beaconslot 1582, e.g., an integer value m in the range 0, . . . 9, identifies which indexed strip symbol the current time corresponds to in a beaconslot, when the time corresponds to a $1^{st}$ time period. $1^{st}$ time period strip symbol index 1584, e.g. a integer value k, identifies an index value used for strip symbols during $1^{st}$ time periods of an ultraslot, e.g. k is an integer value in the range 0 . . . 179, identifying a relative position within the ultraslot of the $1^{st}$ time interval. In some embodiments k is generated as a function of values L and m by $1^{st}$ time period index determination module 1536. Determined tone subset index for current $1^{st}$ time interval 1586 is a result of determination module 1538 which is a function of base station cell identifier 1574, base station sector identifier 1576 and first time period strip symbol index 1584.

Recovered strip symbol modulation symbol information 1588 includes information recovered by modulation symbol recovery module 1542. For example, recovered strip symbol modulation symbol information 1588 includes, for a given recovered strip symbol, information corresponding to a set of 55 or 56 QPSK recovered modulations symbols conveyed by the strip symbol. Control data for $1^{st}$ period symbols 1590 includes control data/information recovered from modulation symbols broadcast during $1^{st}$ time periods on the non-null tones of the strip symbol from the base station attachment point. Information 1590 is an output of control data recovery module 1544. Determined channel estimate 1592 is an output from channel estimation module 1546 and is based as least in part upon the strip signal from the $1^{st}$ time period which is processed. In some embodiments, the channel estimate 1592 is based entirely upon strip signal information. User data 1366 includes data/information, e.g., voice, video, audio, text, image, file, etc. data/information received via modulation symbols of downlink traffic channel segments during $2^{st}$ time periods.

Figure 16:
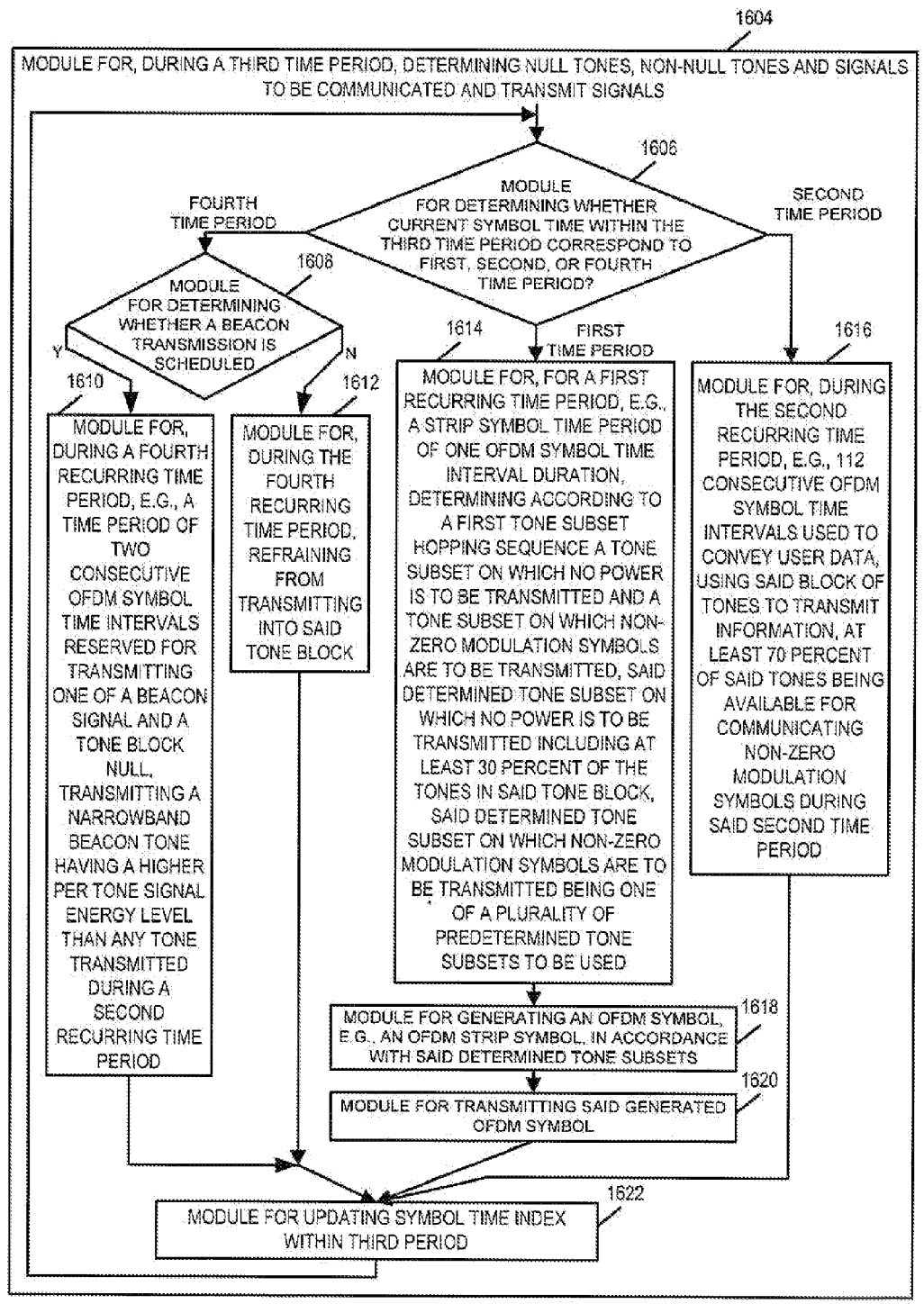
FIG. 16 is a block diagram of an exemplary communications device having modules for operating the communications device, e.g., a base station, to use a block of tones, to communicate information in accordance with various embodiments.

FIG. 16 is a block diagram of an exemplary communications device having modules for operating the communications device, e.g., a base station, to use a block of tones, to communicate information in accordance with various embodiments. Module 1604 determines null-tones, non-null tones, and signals to be communicated during a third time period and transmits signals, e.g., on a recurring basis. For example, the third time period may be an ultraslot in a recurring timing structure being used by the communications device. Module 1604 includes modules 1606, 1608, 1610, 1612, 1614, 1616, 1618, 1620, and 1622.

In module 1606, the communications device determines whether the current symbol time within the third time period corresponds to first, second, or fourth time periods. If the current symbol time period corresponds to a fourth time period, operation proceeds from module 1606 to module 1608. If the current symbol time period corresponds to a first time period, operation proceeds from module 1606 to module 1614. If the current symbol time period corresponds to a second time period, operation proceeds from module 1606 to sub-step 1616.

In module 1608, the communications device determines if a beacon transmission is scheduled to be transmitted in the tone block. If a beacon is scheduled corresponding to the current symbol time, operation proceeds from module 1608 to module 1610; if a beacon is not scheduled corresponding to the current symbol time operation proceeds from sub-step 1608 to module 1612. In module 1610, the communications device, during a fourth recurring time period, e.g., a time period of two consecutive OFDM symbol transmission time intervals reserved for one of a beacon signal and a tone block null, transmits a narrowband beacon tone having a higher per tone signal energy level than any tone transmitted during a second recurring time period. In module 1612, the communications device, during the fourth recurring time period refrains from transmitting into said tone block. Operation proceeds from module 1610 or module 1612 to module 1622.

In some embodiments, different base station attachment points in the communications system used different fourth time periods in the third time period to convey beacon signals, e.g., as a function of a cell, and/or sector identifier. For example, in one exemplary three sector embodiment, a third time period includes 24 indexed fourth time periods.

For example, a sector type 0 attachment point uses fourth time periods with index=0, 3, 6, 9, 12, 15, 18, 21 to convey beacon signals and refrains from transmission during fourth time period with index=1, 2, 4, 5, 7, 8, 10, 11, 13, 14, 16, 17, 19, 20, 22, 23 with respect to the tone block; a sector type 1 attachment point uses fourth time periods with index 1, 4, 7, 10, 13, 16, 19, 22 to convey beacon signals and refrains from transmission during fourth time period with index=0, 2, 3, 5, 6, 8, 9, 11, 12, 14, 15, 17, 18, 20, 21, 23 with respect to the tone block; a sector type 2 attachment point uses fourth time periods with index=2, 5, 8, 11, 14, 17, 20, 23 to convey beacon signals and refrains from transmission during fourth time period with index=0, 1, 3, 4, 6, 7, 9, 10, 12, 13, 15, 16, 18, 19, 21, 22 with respect to the tone block.

In module 1614, for a first recurring time period, e.g., a strip symbol time period of one OFDM symbol time interval duration, the communications device determines according to a first tone hopping sequence a tone subset on which no power is to be transmitted and a tone subset on which non-zero modulation symbols are to be transmitted, said determined tone subset on which no power is to be transmitted including at least 30 percent of the tones in said tone block, said determined tone subset on which modulation symbols are to be transmitted being one of a plurality of predetermined tone subsets to be used.

In some embodiments, for a given first time period in the third time period, the union of the subset of determined null tones and the sub-set of non-null tones is the set of tone block tones for the base station attachment point, e.g., the set of downlink tone block tones for the base station attachment point. FIG. 10 includes exemplary tone subset information corresponding to 97 different subsets of null tones and 97 different subsets of non-null tones. By utilizing a mixture of null and non-null tones, the first time periods transmitted signals may be utilized by a receiver, e.g., a wireless terminal receiver, to perform a channel estimation. In addition broadcast control information is communicated by the values of the non-null modulation symbols communicated during the first time period.

Tone subsets corresponding to a given first time period in the third time period are, in some embodiments, determined as a function of cell, sector identifier, and/or tone block corresponding to the attachment point of the communications device, and OFDM symbol time within the timing structure. For example, attachment points corresponding to adjacent cells and or sectors will use different tone hopping sequences using the same subsets of tones. FIG. 9 describes exemplary tone hopping determination.

Operation proceeds from module 1614 to module 1618. In module 1618, the communications device generates an OFDM symbol in accordance with the determined tone subsets from module 1614. Operation proceeds from module 1618 to module 1620. In module 1620, the communications device transmits the generated OFDM symbol from module 1218. Operation proceeds from module 1220 to module 1222.

In module 1616, the communications device, during the second recurring time period, e.g., 1112 consecutive OFDM symbol time intervals used to convey user data, the communications device uses said block of tones to transmit information, at least 70 percent of said tones of said tone block being available for communicating non-zero modulation symbols during said second time period. For example, during said second time period downlink traffic channel segment signals are communicated in addition to some control signals. In module 1616, logical channel tones, in some embodiments, are hopped to physical tones in accordance with a tone hopping scheme which is different from the tone subset hopping applicable to first time periods. In some such embodiments, both the tone hopping applicable during second time periods and the tone subset hopping applicable during first time periods utilize cell and/or sector identifier information as inputs to determine hopping, e.g., tone hopping, tone subset hopping. For example different equations are used during first and second time periods with respect to hopping for the same base station sector attachment point. Operation proceeds from module 1616 to module 1622.

In module 1622, the communications device updates the symbol time index within the third time period. For example, in one embodiment, if operations had proceeded to module 1622 via module 1610 or 1622 the index is updated by 2 OFDM symbol transmission time periods; if operations had proceeded to module 1622 via module 1614, the index is updated by one OFDM symbol transmission time period; if operations had proceeded to module 1622 via module 1616, the index is updated by 112 OFDM symbol transmission time periods. In various embodiments, the updating uses modular calculations such that indexing starts for the next successive third time period, e.g., ultraslot, when a third time period completes. Operation proceeds from module 1622 to module 1606.

In various embodiments, the second recurring time period has a duration of at least time 10 times the duration of the first time period. In some embodiments, the second time period has a duration of greater than 50 times the duration of the first time period. In some embodiments, the second time period has a duration of greater than 100 times the duration of the first time period. Since, in some embodiments, second time periods correspond to user data transmission periods, the balance between first and second time periods and the positioning within the timing structure of time periods such as first and fourth time periods in which there is no user data communicated can be an important consideration in achieving uninterrupted user data communications from a user's perspective, particularly in applications needing low latency, e.g., such as a voice application. In some embodiments, exemplary third time periods start with a fourth time period since fourth time periods are utilized to carry beacon signals which are used by wireless terminals in performing synchronization, e.g., frame synchronization.

In various embodiments, for a first time period, the first set tone hopping sequence determines which one of a plurality of predetermined tone subsets to use. For example, the first tone set hopping sequence for a given first time period in a recurring timing structure for a given base station attachment point determines to use the tone subset information corresponding to one of the 97 rows of the table 1000 of FIG. 10. In various embodiments, different adjacent base station attachment points in the wireless communications system use different first time period tone subset hopping sequences.

In various embodiments, the first and second time periods occur within a third time period that repeats on a predetermined basis, OFDM symbol transmission time periods within first time periods being indexed using a modular incremental index, and the first tone set hopping sequence is a function of the modular incremental index. For example, an exemplary ultraslot may include 180 indexed first time periods, but the first tone hopping sequence starts repeating on the 98$^{th}$ first time period in the ultraslot.

In various embodiments, the number of predetermined tone subsets, corresponding to at least one of null tone subsets and non-null tone subsets is a prime number. In the example of FIG. 10, the prime number is 97.

In one exemplary embodiment, the tone subset allocation sequence, sometimes also referred to as the tone subset hopping sequence is given as follows.

Let f (bssSlopeIndex, bssSectorType, k)=(bssSlopeIndex+ 1)/((bssSectorType*k+k$^2$) represents the index of the tone subset to be selected in strip-symbol k, where each of the arithmetic operators (+, $^2$, *, /) are defined in the field of N, where N is a prime number, for example. N=97;

bssSlopeIndex=the index of the cell slope value, and is preferably the same for each of the sectors of the cell; adjacent cells should have different values for the bssSlopeIndex; parameter bssSlopeIndex is equal to 0, 1, . . . , $N_1$−1, where $N_1 \leq N$; e.g., in one embodiment, $N_1$=96;

bssSectorType=index of the sector; e.g. assume sector type T is in the set {0, 1, . . . , 5}, {0,1} or {0,1,2}; adjacent sectors in a given base station should have different values of T;

f=a function in a sector of a base station;

k=an index of strip-symbol period, where k=L*10+m where m=strip symbol index in a beaconslot, e.g., m is a value in the set {0, 1, . . . , 9}.

L=beaconslot index in an ultraslot, e.g., L=a value in the set {0, 1, . . . , 17}

Expressed in a slightly different format:

$k=L*10+m;$ $temp0=bssSectorType*k+k*k;$ $temp1=imod(temp0,N);$ $f(bssSlopeIndex,bssSectorType,k)=mod(temp1*(bssSlopeIndex+1),N);$ where for integers x and in, the modulo function mod(x, m) is defined as mod(x, m)=x−m*floor(x/m) where the function floor(x) is defined as the largest integer less than or equal to x; for integers x and m, the inverse modulo function imod(x, m) is equal to y, where 1≦y≦m, if mod(x*y, m) is equal to 1. If mod(x, m) is zero, then imod(x, m) is set to 0.

In various embodiments the first tone subset hopping sequence is a function of a cell identifier, e.g., a slope value. In various embodiments, the first tone hopping sequence is also a function of a sector identifier value.

Figure 17A:
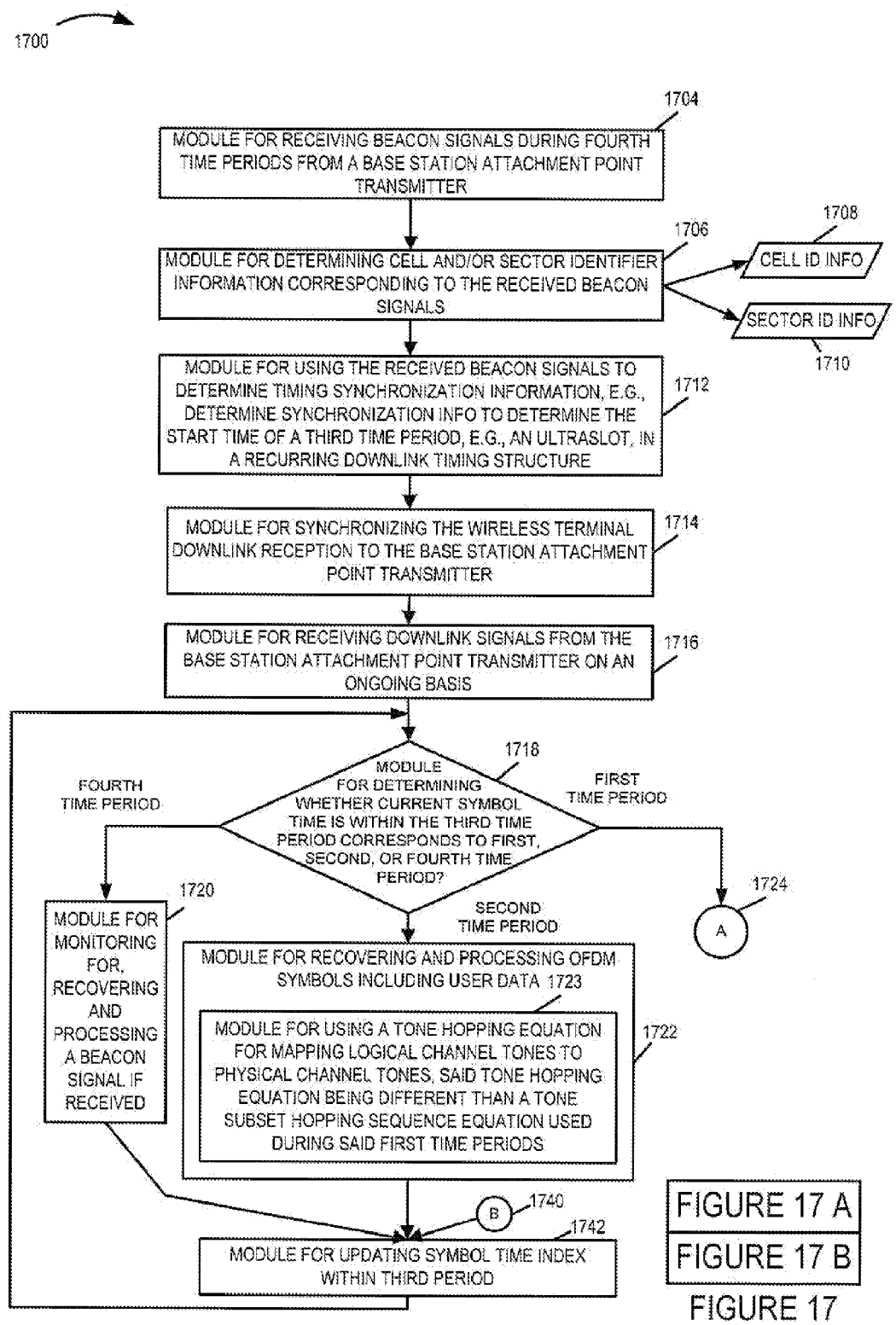
FIG. 17 comprising the combination of FIG. 17A
FIG. 17B is a block diagram of an exemplary wireless terminal having modules for operating the wireless terminal in accordance with various embodiments.
Figure 17B:
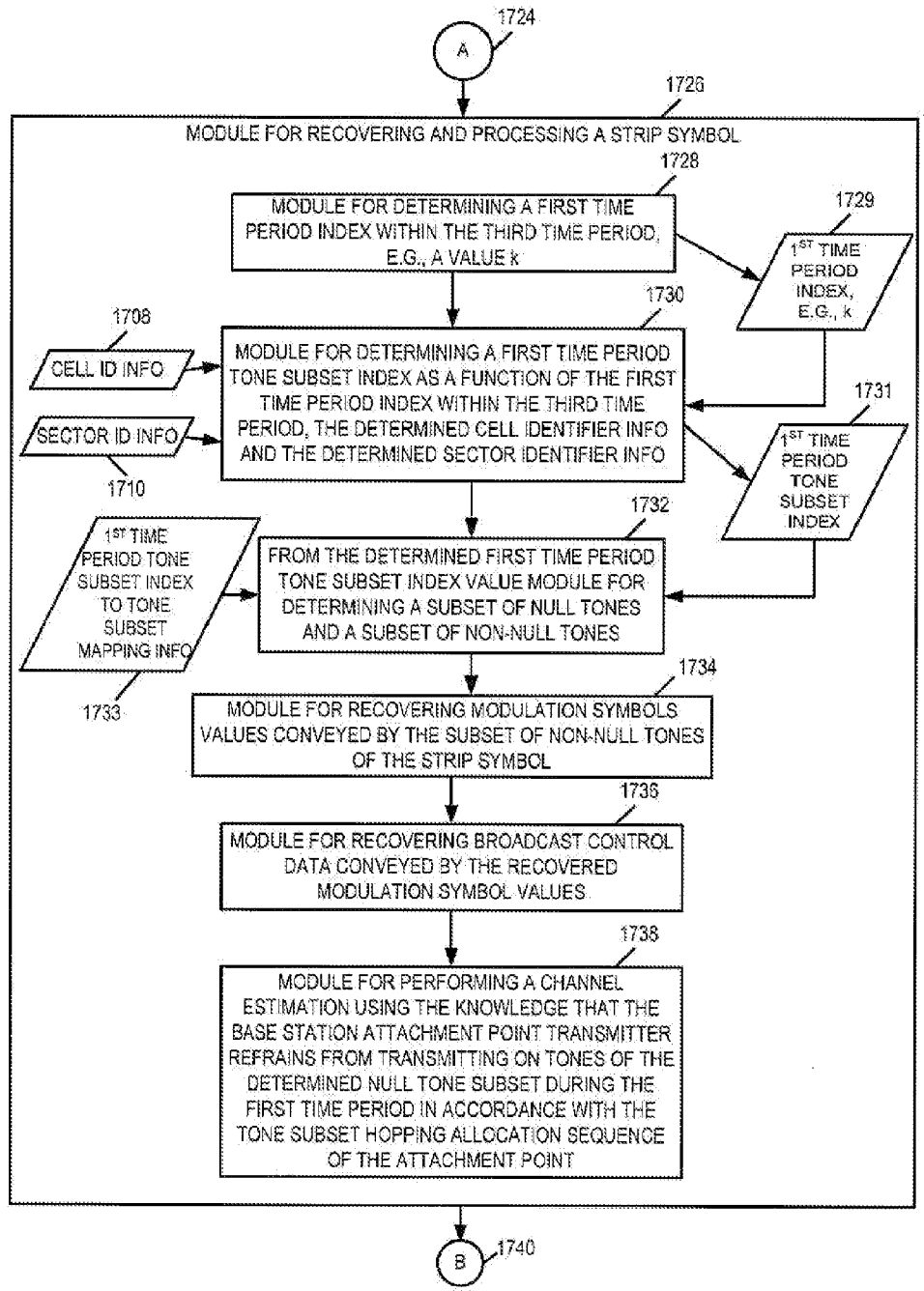

FIG. 17 comprising the combination of FIG. 17A and FIG. 17B is a block diagram of an exemplary wireless terminal having modules for operating the wireless terminal in accordance with various embodiments. Wireless terminal 1700 includes module 1704, in which the wireless terminal receives beacon signals during fourth time periods from a base station attachment point transmitter. Operation proceeds from module 1704 to module 1706. In module 1706 the wireless terminal determines cell and/or sector identifier information (1708, 1710) corresponding to the received beacon signals from the base station attachment point transmitter. Operation proceeds from module 1706 to module 1712. In module 1712, the wireless terminal uses the received beacon signals to determine timing synchronization information. For example, the wireless terminal determines synchronization information to determine the start time of a third time period, e.g., an ultraslot, in a recurring downlink timing structure. Then, in module 1714, the wireless terminal uses the determined synchronization information from module 1714 to synchronize the wireless terminal's downlink reception to the base station attachment point transmitter. Operation proceeds from module 1714 to module 1716.

In module 1716, the wireless terminal receives downlink signals from the base station attachment point transmitter on an ongoing basis. Operation proceeds from module 1716 to module 1718. In module 1718, the wireless terminal determines whether the current symbol time within the third time period corresponds to a first, second, or third time period. If the current symbol time within the third time period corresponds to a fourth time period, operation proceeds from module 1718 to module 1720; if the current symbol time within the third time period corresponds to a second time period, operation proceeds from module 1718 to module 1722; if the current symbol time within the third time period corresponds to a first time period, operation proceeds from module 1718 via connecting node A 1724 to module 1726.

In module 1720, the wireless terminal monitors for, recovers and processes a beacon signal if received. In some embodiments, some fourth time periods convey beacon signals while some fourth time periods corresponds to intentional downlink tone block nulls by the base station attachment point transmitter. Operation proceeds from module 1720 to module 1742.

In module 1722, the wireless terminal recovers and processes OFDM symbols including user data. Module 1722 includes module 1723. In module 1723, the wireless terminal uses a tone hopping equation for mapping logical channel tones to physical channel tones, said tone hopping equation being different than a tone subset hopping sequence equation used during said first time periods. In various embodiments, the hopping function of module 1723 uses as input at least one of cell ID information 1408 and sector ID information 1410. Operation proceeds from module 1722 to module 1742.

In module 1726, the wireless terminal recovers and processes a strip symbol. Module 1426 includes modules 1728, 1730, 1732, 1734, 1736 and 1738. In module 1728, the wireless terminal determines a first time period index within the third time period, e.g., a value k 1729. Operation proceeds from module 1728 to module 1730.

In module 1730, the wireless terminal determines a first time period tone subset index 1731 as a function of the first time period index within the third time period 1729, the determined cell identifier information 1408 and the determined sector identifier information 1410. For example, in module 1730, the same tone subset hopping function previously described with respect to flowchart 1200 and base station 1300 for $1^{st}$ time periods may be used. Operation proceeds from module 1730 to module 1732. In module 1732, the wireless terminal uses the determined $1^{st}$ time period tone subset index value 1731 and stored $1^{st}$ time period tone subset index to tone subset mapping information 1733 to determine a subset of null tones and a subset of non-null tones. In one exemplary embodiment mapping information 1733 may include information of table 1000 of FIG. 10. Operation proceeds from module 1732 to sub-step 1734.

In module 1734, the wireless terminal recovers modulation symbol values conveyed by the identified subset of non-null tones of the strip symbol. Operation proceeds from module 1734 to module 1736. In module 1736, the wireless terminal recovers broadcast control data conveyed by the recovered modulation symbol values. Operation proceeds from module 1736 to module 1738. In module 1738, the wireless terminal performs a channel estimation using the knowledge that the base station attachment point transmitter refrains from transmitting on the tones of the determined null tone subset during the first time period in accordance with the tone subset hopping allocation sequence of the attachment point. In various embodiments, the operation of modules 1734, 1736 and 1738 are performed in a different order and/or one or more of modules 1734, 1736, 1738 are performed jointly. For example, channel estimation may precede broadcast control data recovery. Operation proceeds from step 1726 via connecting node B 1740 to module 1742.

In module 1742, the wireless terminal updates the symbol time index within the third time period. Depending upon the path to step 1742, the amount of indexing update is, in some embodiments, different. For example, in one exemplary embodiment, a fourth time period occupies two consecutive OFDM symbol transmission time periods, a second time period occupies 112 consecutive OFDM symbol transmission time periods, and a first time period occupies a single OFDM symbol transmission time period. The updating of module 1742 also takes into account that the third period indexing restarts when a third time period is completed, e.g., using modular operations. In some embodiments, the first time period tone subset index value, k, is reset, e.g., to 0, at the start of a new third time period, e.g., new ultraslot.

Operation proceeds from module 1742 to module 1718, where the wireless terminal determines whether the current symbol time index within the third time period corresponds to a first, second or fourth time period.

The various modules described with respect to FIGS. 16 and 17 may be combined into fewer modules. For example, modules 1610 and 1612 may be included in a single module. Further the various modules described with respect to FIGS. 16 and 17 may be represented in one or more modules in FIGS. 2, 3, 9, 13 and 15.

In various embodiments, a received strip symbol is an OFDM symbol which corresponds to a transmitted OFDM symbol which was transmitted by a base station attachment point transmitter using a subset of null tones and a subset of non-null tones, said subset of null tones being at least 30% of the tones in the downlink tone block. In some such embodiments, the subset of non-null tones is used to communicate broadcast control information directed to a plurality of wireless terminals.

In various embodiments, during $2^{nd}$ recurring time periods, a block of downlink tones, e.g., a downlink tone block of 113 tones, is used to transmit information, at least 70% of the said downlink tone block tones being available for communicating non-zero modulation symbols during a $2^{nd}$ time period. In some embodiments, a second time period has a duration at least 10 times the duration of a $1^{st}$ time period. In one exemplary embodiment, a $1^{st}$ time period has a duration of 1 OFDM symbol transmission time interval and a $2^{nd}$ time period has a duration of 112 OFDM symbol transmission time intervals. In some embodiments, the timing structure is such that multiple, e.g., two or three $1^{st}$ time periods are grouped together. In some embodiments, the timing structure is such that a predetermined grouping of $1^{st}$ time periods has the same duration as a fourth time period, e.g., a fourth time period during which a beacon signal can be communicated.

The techniques of some embodiments may be implemented using software, hardware and/or a combination of software and hardware. Some embodiments is directed to apparatus, e.g., mobile nodes such as mobile terminals, base stations, communications system which implement some embodiments. It is also directed to methods, e.g., method of controlling and/or operating mobile nodes, base stations and/or communications systems, e.g., hosts, in accordance with some embodiments. Some embodiments is also directed to machine readable medium, e.g., ROM, RAM, CDs, hard discs, etc., which include machine readable instructions for controlling a machine to implement one or more steps in accordance with some embodiments.

In various embodiments nodes described herein are implemented using one or more modules to perform the steps corresponding to one or more methods of some embodiments, for example, signal processing, message generation and/or transmission steps. Thus, in some embodiments various features of some embodiments are implemented using modules. Such modules may be implemented using software, hardware or a combination of software and hardware. Many of the above described methods or method steps can be implemented using machine, executable instructions, such as software, included in a machine readable medium such as a memory device, e.g., RAM, floppy disk, etc to control a machine, e.g., general purpose computer with or without additional hardware, to implement all or portions of the above described methods, e.g., in one or more nodes. Accordingly, among other things, some embodiments is directed to a machine-readable medium including machine executable instructions for causing a machine, e.g., processor and associated hardware, to perform one or more of the steps of the above-described method(s).

While described in the context of an OFDM system, at least some of the methods and apparatus of some embodiments, are applicable to a wide range of communications systems including many non OFDM and/or non-cellular systems.

Numerous additional variations on the methods and apparatus of some embodiments described above will be apparent to those skilled in the art in view of the above description of some embodiments. Such variations are to be considered within the scope of some embodiments. The methods and apparatus of some embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of some embodiments.

What is claimed is:

1. A method comprising:
transmitting, via a first carrier, a plurality of overhead payloads including a first overhead payload and a second overhead payload,
wherein the first overhead payload comprises a first flexible bit portion and a first fixed bit portion, the first fixed bit portion comprising a first message corresponding to a first message type and a second message corresponding to a second message type,
wherein the second overhead payload comprises a second flexible bit portion and a second fixed bit portion, the second fixed bit portion comprising a third message corresponding to the first message type and a fourth message corresponding to a third message type, and
wherein the second message type is distinct from the third message type.

2. The method of claim 1, wherein the first message type specifies at least one of: a software version, a system time, an access priority, loading information, a carrier configuration, a sector configuration, or transmission power.

3. The method of claim 1, wherein the first flexible bit portion comprises a loading message associated with a second carrier.

4. The method of claim 1, wherein the first overhead payload is transmitted from a first base station sector, and wherein the first flexible bit portion comprises a loading message associated with a second base station sector.

5. The method of claim 1, further comprising transmitting, via the first carrier, a beacon time signal periodically according to a beacon time period.

6. The method of claim 5, further comprising transmitting, via the first carrier, a plurality of data payloads distinct from the beacon time signal, wherein each data payload is transmitted during a corresponding data payload time period of a plurality of data payload time periods that have a common duration and wherein the transmission of the data payloads is interleaved with transmission of the beacon time signal.

7. The method of claim 6, wherein each of the plurality of overhead payloads is transmitted during a corresponding overhead payload time period of a plurality of overhead payload time periods that have a common duration, the overhead payload time periods interleaved with the data payload time periods.

8. The method of claim 7, wherein each of the plurality of overhead payloads further comprises a corresponding flexible bit portion, and a corresponding fixed bit portion, each corresponding fixed bit portion comprising:
a corresponding fixed bit message corresponding to the first message type; and
a corresponding second fixed bit message corresponding to a selected message type of a plurality of message types, wherein each of the plurality of message types has a corresponding transmission periodicity, and wherein selection of the message type is determined by the corresponding transmission periodicity.

9. The method of claim 1, wherein the first message is identical to the third message.

10. The method of claim 1, wherein bits in the first fixed bit portion and the second fixed bit portion have a predetermined use based on a position of the bits.

11. A transmission device comprising:
a memory including stored transmitter control information;
a communication module for using a block of tones to transmit information;
a determination module configured to:
generate a plurality of overhead payloads including a first overhead payload and a second overhead payload,
wherein the first overhead payload comprises a first flexible bit portion and a first fixed bit portion, the first fixed bit portion comprising a first message corresponding to a first message type and a second message corresponding to a second message type,
wherein the second overhead payload comprises a second flexible bit portion and a second fixed bit portion the second fixed bit portion comprising a third message corresponding to the first message type and a fourth message corresponding to a third message type, and
wherein the second message type is distinct from the third message type; and
a transmitter configured to transmit, via a first carrier, each of the plurality of overhead payloads.

12. The transmission device of claim 11, wherein the first message type specifies at least one of: a software version, a system time, an access priority, loading information, a carrier configuration, a sector configuration, or transmission power.

13. The transmission device of claim 11, wherein the first flexible bit portion comprises a loading message associated with a second carrier.

14. The transmission device of claim 11, wherein the first overhead payload is transmitted from a first base station sector, and wherein the first flexible bit portion comprises a loading message associated with a second base station sector.

15. A communications device operable to use a block of tones to communicate information, the communications device comprising:
means for transmitting, via a first carrier, a plurality of overhead payloads including a first overhead payload and a second overhead a payload,
wherein the first overhead payload comprises a first flexible bit portion and a first fixed bit portion, the first fixed bit portion comprising a first message corresponding to a first message type and a second message corresponding to a second message type,
wherein the second overhead payload comprises a second flexible bit portion and a second fixed bit portion, the second fixed bit portion comprising a third message corresponding to the first message type and a fourth message corresponding to a third message type, and
wherein the second message type is distinct from the third message type.

16. The communications device of claim 15, wherein the first message type specifies at least one of: a software version, a system time, an access priority, loading information, a carrier configuration, a sector configuration, or transmission power.

17. The communications device of claim 15, wherein the first flexible bit portion comprises a loading message associated with a second carrier.

18. The communications device of claim 15, wherein the first overhead payload is transmitted from a first base station sector, and wherein the first flexible bit portion comprises a loading message associated with a second base station sector.

19. A non-transitory computer-readable device storing instructions which, when executed by a processor, cause the processor to:
generate a plurality of overhead payloads including a first overhead payload and a second overhead payload, wherein the first overhead payload comprises a first flexible bit portion and a first fixed bit portion, the first fixed bit portion comprising a first message corresponding to a first message type and a second message corresponding to a second message type, wherein the second overhead payload comprises a second flexible bit portion and a second fixed bit portion, the second fixed bit portion comprising a third message corresponding to the first message type and a fourth message corresponding to a third message type, wherein the second message type is distinct from the third message type.

20. The non-transitory computer-readable device of claim 19, wherein the first message type specifies at least one of a software version, a system time, an access priority, loading information, a carrier configuration, a sector configuration, or transmission power.

21. The non-transitory computer-readable device of claim 19, wherein the first overhead payload is transmitted via a first carrier, and wherein the first flexible bit portion comprises a loading message associated with a second carrier.

22. The non-transitory computer-readable device of claim 19, wherein the first overhead payload is transmitted from a first base station sector, and wherein the first flexible bit portion comprises a loading message associated with a second base station sector.

23. An apparatus operable in a wireless communication system to use a block of tones to communicate information, the apparatus comprising:

a memory including stored transmitter control information; and a processor configured to:

generate a plurality of overhead payloads including a first overhead payload and a second overhead payload, wherein the first overhead payload comprises a first flexible bit portion and a first fixed bit portion, the first fixed bit portion comprising a first message corresponding to a first message type and a second message corresponding to a second message type, wherein the second overhead payload comprises a second flexible bit portion and a second fixed bit portion, the second fixed bit portion comprising a third message corresponding to the first message type and a fourth message corresponding to a third message type, and wherein the second message type is distinct from the third message type.

24. The apparatus of claim 23, wherein the first message type specifies at least one of: a software version, a system time, an access priority, loading information, a carrier configuration, a sector configuration, or transmission power.

25. The apparatus of claim 23, wherein the first overhead payload is transmitted via a first carrier, and wherein the first flexible bit portion comprises a loading message associated with a second carrier.

26. The apparatus of claim 23, wherein the first overhead payload is transmitted from a first base station sector, and wherein the first flexible bit portion comprises a loading message associated with a second base station sector.

* * * * *